(12) United States Patent
Smith et al.

(10) Patent No.: US 9,894,304 B1
(45) Date of Patent: Feb. 13, 2018

(54) LINE-INTERLEAVED IMAGE SENSORS

(71) Applicant: Rambus Inc., Sunnyvale, CA (US)

(72) Inventors: Craig M. Smith, Spencerport, NY (US); Michael Guidash, Rochester, NY (US); Thomas Vogelsang, Mountain View, CA (US); Jay Endsley, San Jose, CA (US); Michael T. Ching, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 70 days.

(21) Appl. No.: 14/827,838

(22) Filed: Aug. 17, 2015

Related U.S. Application Data

(60) Provisional application No. 62/038,804, filed on Aug. 18, 2014, provisional application No. 62/046,827, filed on Sep. 5, 2014, provisional application No. 62/076,011, filed on Nov. 6, 2014, provisional application No. 62/080,041, filed on Nov. 14, 2014.

(51) Int. Cl.
*H04N 5/374* (2011.01)
*H04N 5/369* (2011.01)

(52) U.S. Cl.
CPC ......... *H04N 5/3742* (2013.01); *H04N 5/3692* (2013.01)

(58) Field of Classification Search
CPC .. H04N 5/3742; H04N 5/3692; H04N 5/2351; H04N 9/045; H04N 5/378; H04N 5/355
See application file for complete search history.

(56) References Cited

U.S. PATENT DOCUMENTS

| | | | |
|---|---|---|---|
| 7,099,056 B1* | 8/2006 | Kindt | H04N 5/2351 348/96 |
| 7,855,740 B2* | 12/2010 | Hamilton, Jr. | H04N 5/3452 348/266 |
| 8,164,651 B2 | 4/2012 | Hamilton, Jr. et al. | |
| 8,355,074 B2 | 1/2013 | Deever et al. | |
| 8,625,013 B2 | 1/2014 | Jannard et al. | |
| 2006/0192867 A1* | 8/2006 | Yosefin | H04N 5/3535 348/273 |
| 2010/0309333 A1* | 12/2010 | Smith | H04N 5/235 348/230.1 |
| 2013/0070121 A1 | 3/2013 | Gu et al. | |

(Continued)

*Primary Examiner* — Luong T Nguyen
(74) *Attorney, Agent, or Firm* — Charles Shemwell

(57) ABSTRACT

Photocharge is integrated within a first plurality of pixels of an integrated-circuit image sensor during a first exposure interval. A read-out signal is output from each pixel of the first plurality of pixels upon conclusion of the first exposure interval, each read-out signal indicating a respective level of photocharge integrated within the corresponding pixel during the first exposure interval. Photocharge is also integrated within a second plurality of pixels during a second exposure interval that transpires concurrently with the first exposure interval and has a duration not more than half the duration of the first exposure interval. A read-out signal is output from each pixel of the second plurality of pixels at least twice with respect to the second exposure interval, with each such read-out signal indicating a respective level of photocharge integrated within the corresponding pixel during at least a portion of the second exposure interval.

20 Claims, 19 Drawing Sheets

(56) References Cited

U.S. PATENT DOCUMENTS

| | | | |
|---|---|---|---|
| 2013/0182165 A1* | 7/2013 | Kimura | H04N 5/335 |
| | | | 348/311 |
| 2014/0027613 A1 | 1/2014 | Smith | |
| 2014/0063300 A1 | 3/2014 | Lin et al. | |
| 2014/0321766 A1 | 10/2014 | Jo | |

* cited by examiner

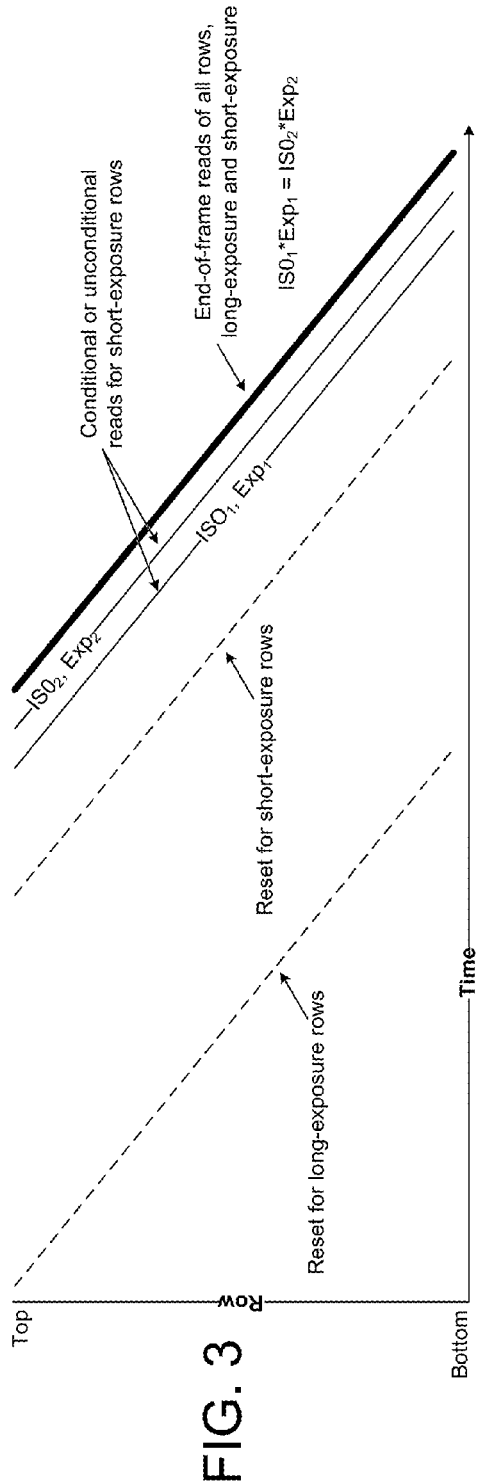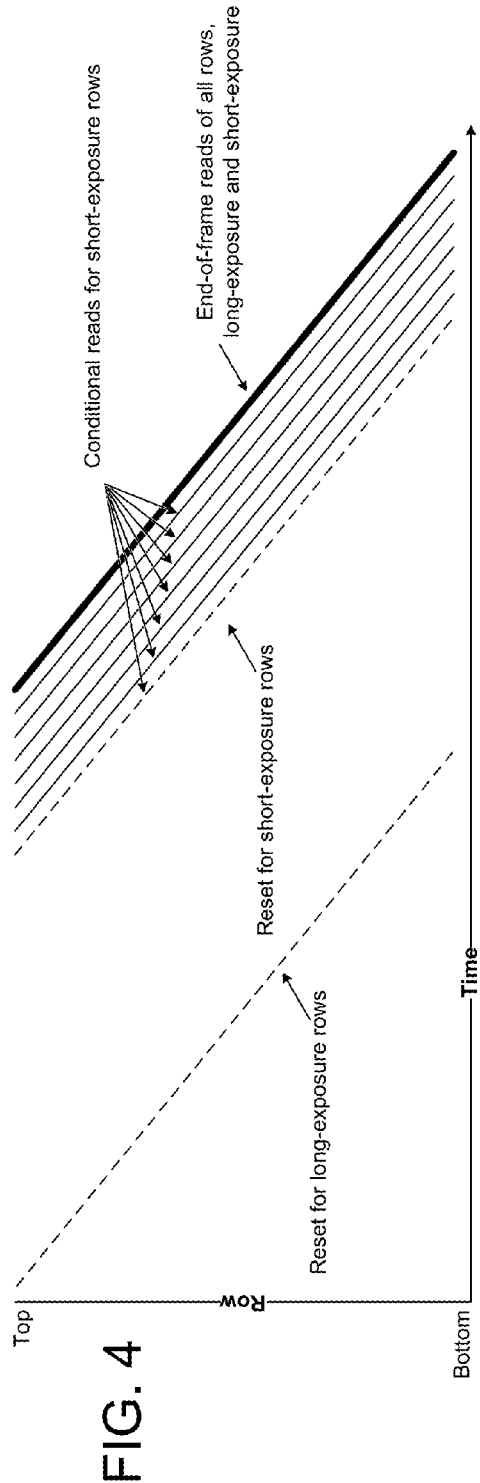

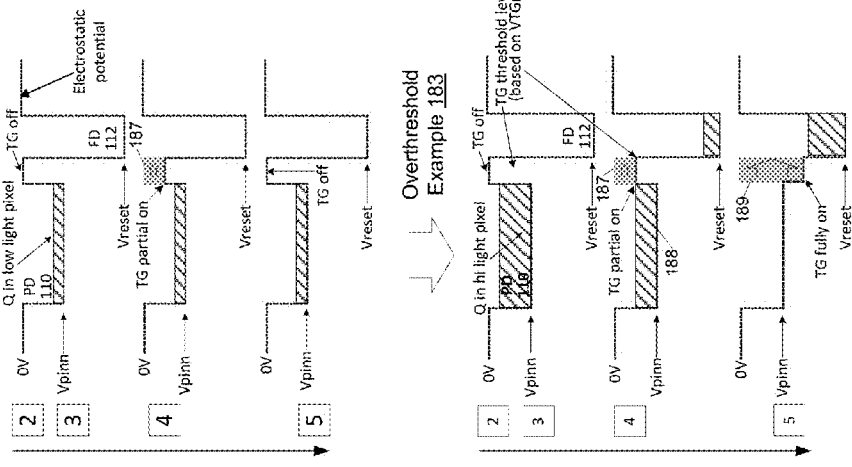
FIG. 7
Conditional-Read
Underthreshold Example 181 → Overthreshold Example 183
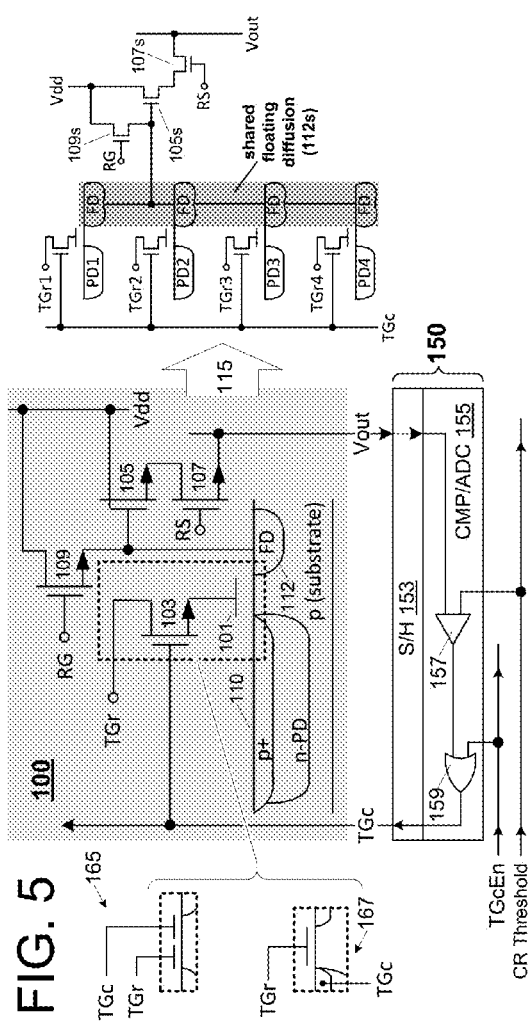
FIG. 5
FIG. 6

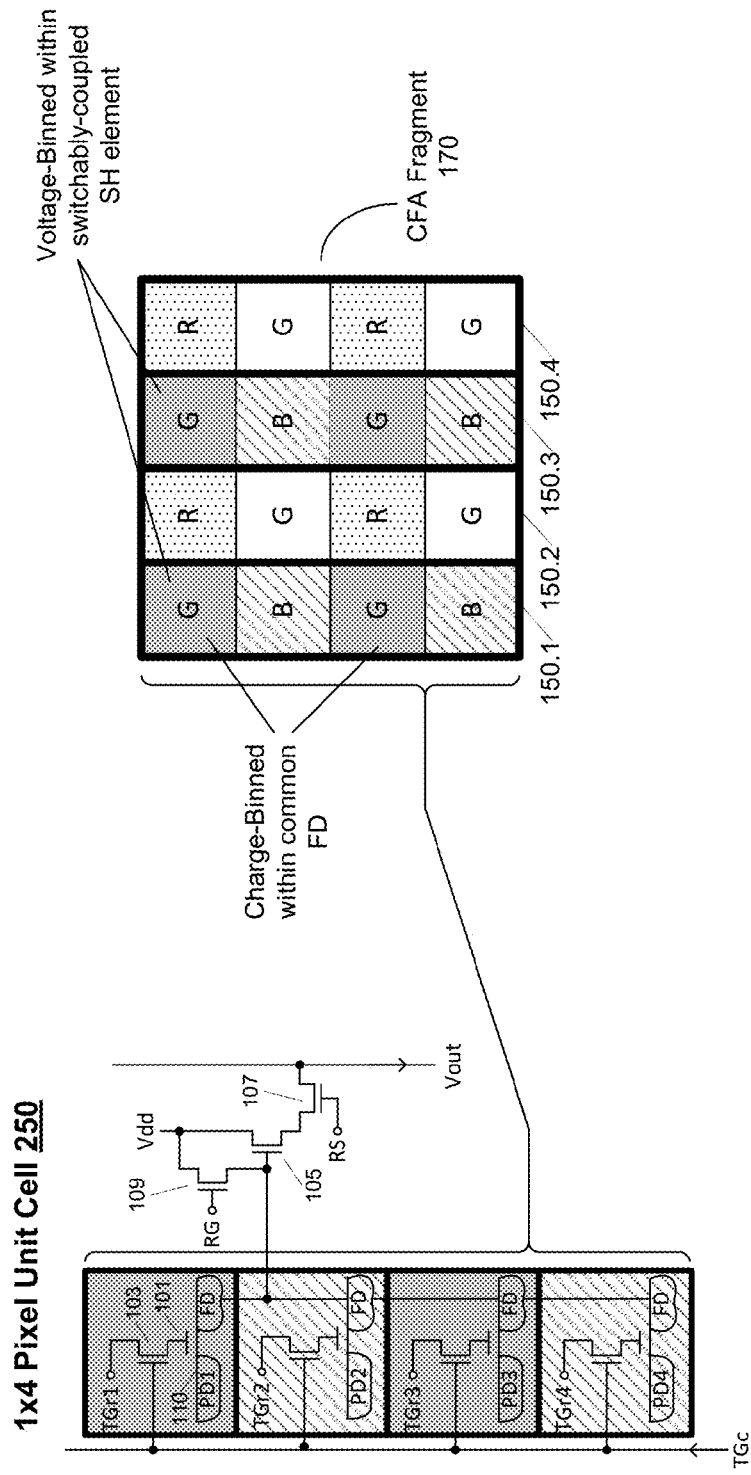

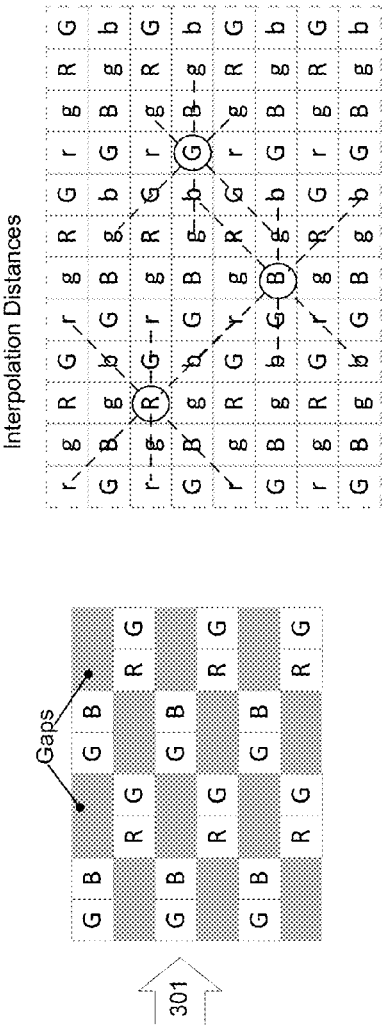
FIG. 11A
Serpentine TG Line Routing
FIG. 11B
Interpolation Distances
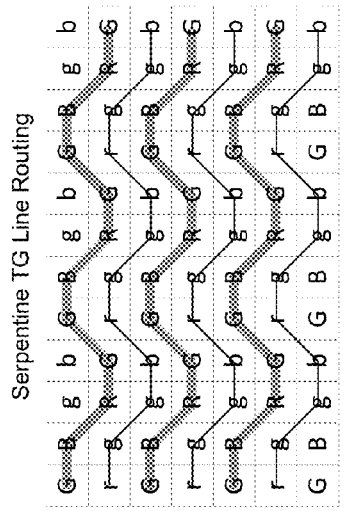
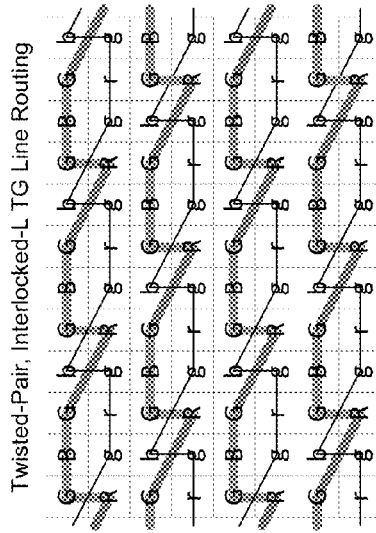
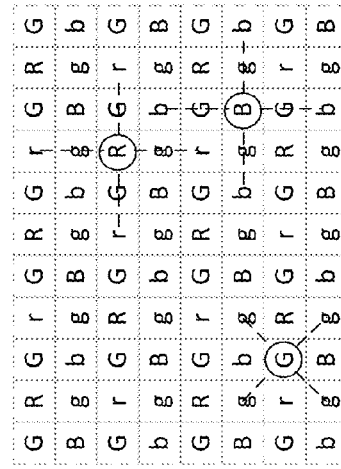
FIG. 12A
Twisted-Pair, Interlocked-L TG Line Routing
FIG. 12B
Interpolation Distances

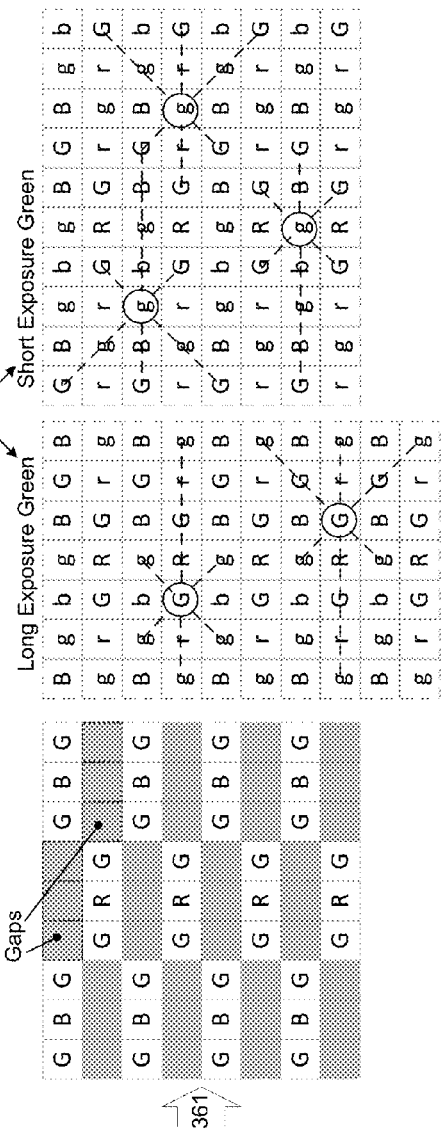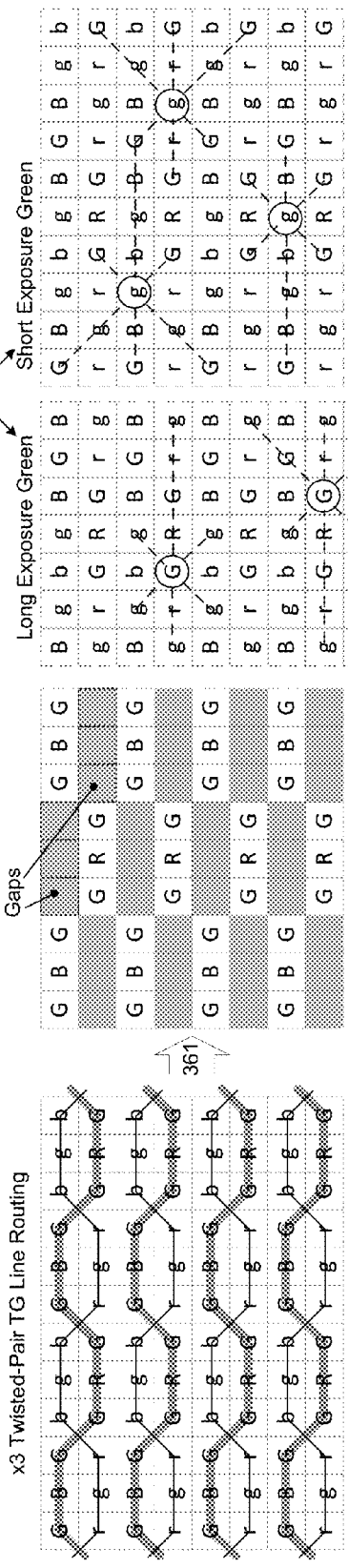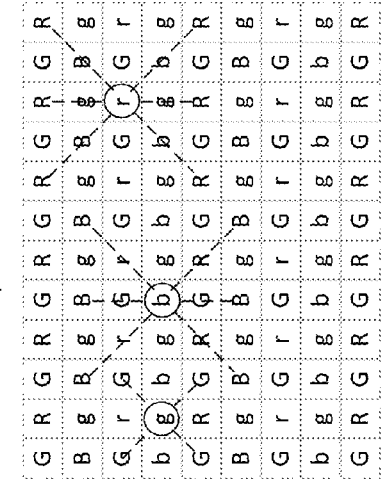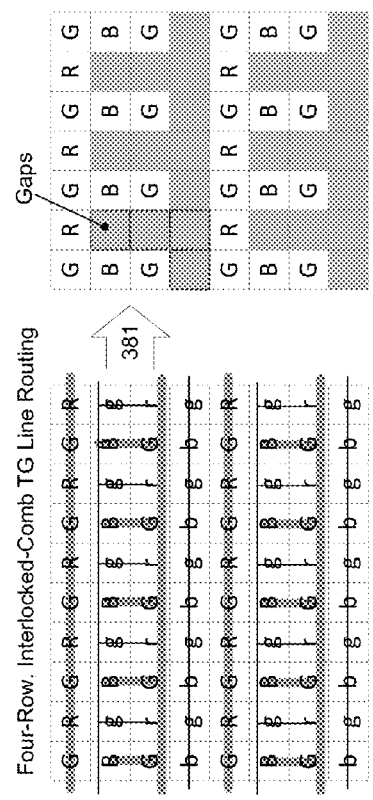
FIG. 13A x3 Twisted-Pair TG Line Routing
FIG. 13B Long Exposure Green / Short Exposure Green — Interpolation Distances
FIG. 14A Four-Row, Interlocked-Comb TG Line Routing
FIG. 14B Interpolation Distances

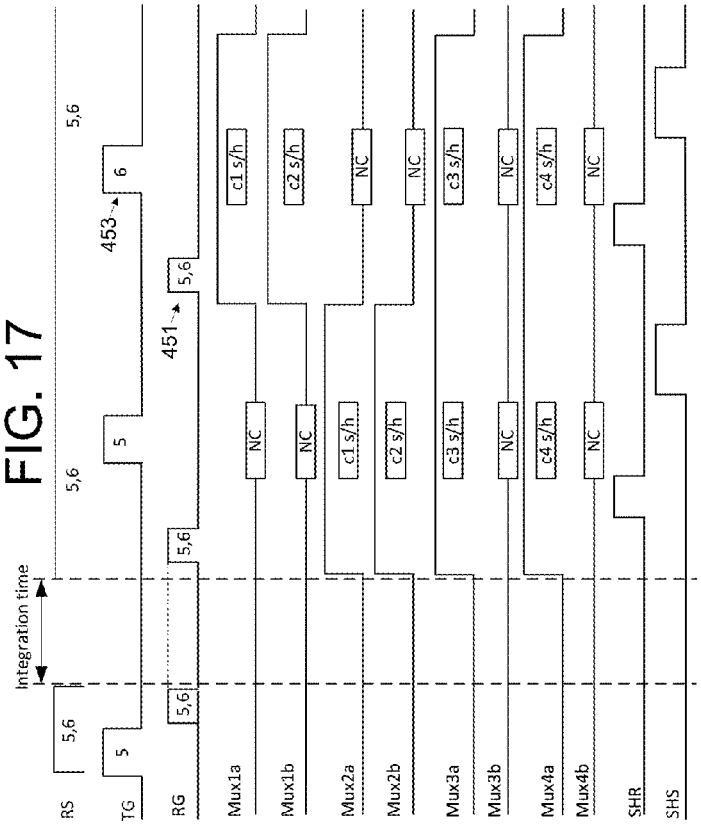
FIG. 17
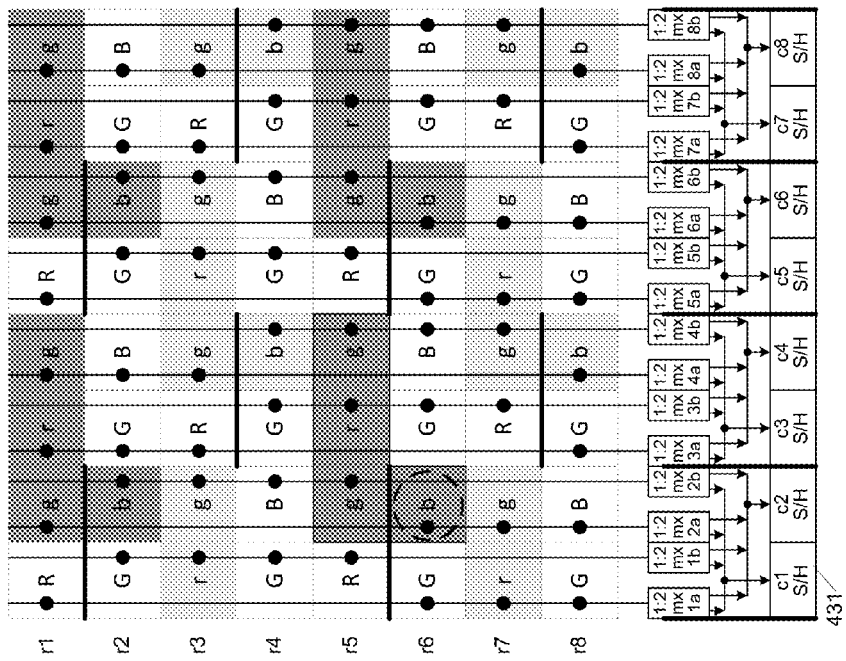
FIG. 16
FIG. 18

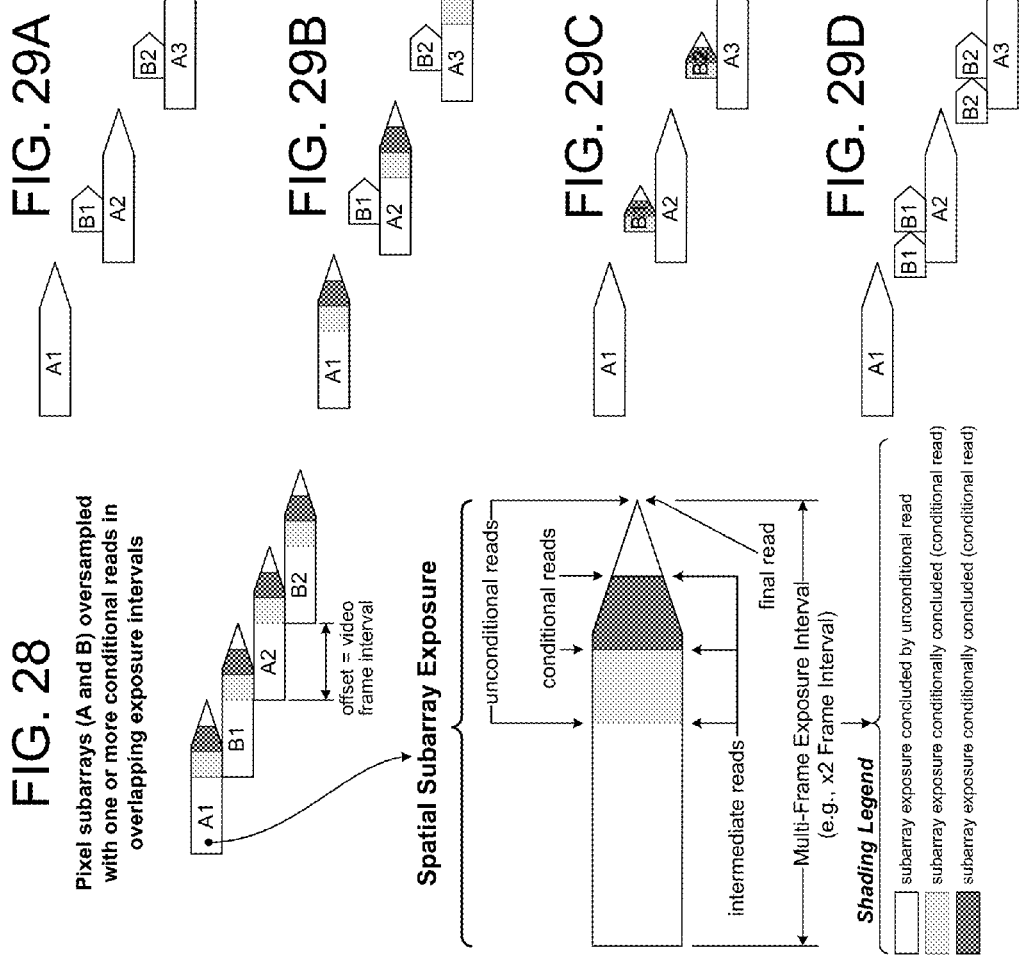

LINE-INTERLEAVED IMAGE SENSORS

CROSS-REFERENCE TO RELATED APPLICATIONS

This application hereby claims priority to and incorporates by reference each of the following U.S. Provisional Patent Applications:

| application Ser. No. | Filing Date | Title |
| --- | --- | --- |
| 62/038,804 | 18 Aug. 2014 | Improved Line Interleaved Patterns For HDR Imaging |
| 62/046,827 | 5 Sep. 2014 | Line-Interleaved Conditional-Read Image Sensors |
| 62/076,011 | 6 Nov. 2014 | Image Sensor Readout With Transfer-Gate Nulling |
| 62/080,041 | 14 Nov. 2014 | Line-Interleaved Image Sensors |

TECHNICAL FIELD

The present disclosure relates to the field of integrated-circuit image sensors.

BACKGROUND

A line-interleaved image sensor exposes odd rows and even rows of a pixel array for different intervals, one long and one short, to capture dark and bright parts of a scene. Pixel data is read out from both sets of rows at the conclusion of a frame interval and merged into a high dynamic range (HDR) image. Unfortunately, the short exposure tends to be noisy, yielding motion-induced artifacts (as it is difficult distinguish scene motion from noise) and noisy bright regions in the final image.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 3 illustrates an alternative exposure profile for a conditional-read line-interleaved image sensor, in this case employing non-uniform subframe intervals within the short exposure to extend the overall short exposure interval without shortening the briefest of the subframe intervals;

FIG. 4 illustrates an exemplary line-interleaved read-out in which seven subframe readouts are executed per short-subframe, so that a total of eight subframes are read-out per frame interval;

FIG. 5 illustrates embodiments of a conditional-read pixel and column read-out logic in which a non-destructive over-threshold detection operation is executed to enable conditional-read/reset in conjunction with correlated double sampling;

FIG. 6 is a timing diagram illustrating an exemplary pixel cycle within the conditional-read pixel of FIG. 5;

FIG. 7 illustrates exemplary electrostatic potential diagrams for a photodiode, transfer gate and floating diffusion of a conditional-read pixel to illustrate underthreshold (low-light) and overthreshold (bright light) read-out operations;

FIG. 9 illustrates pixels disposed within 1×4 pixel unit cells with respect to a color filter array (CFA) that illuminates individual pixels with light corresponding to different wavelength bands in a Bayer pattern;

FIG. 11A illustrates a single-line interleaved pixel subarray pattern in which the transfer-gate control line ("TG line") is routed in serpentine fashion between pixels in adjacent rows;

FIG. 11B illustrates interpolation distances resulting from null data gaps in the line-interleaved pattern of FIG. 11A;

FIG. 12A illustrates a "twisted-pair, interlocked-L" transfer-gate line interleaving pattern;

FIG. 12B illustrates interpolation distances resulting from null data gaps in the line-interleaved pattern of FIG. 12A;

FIG. 13A illustrates a "×3 twisted-pair" transfer-gate line interleaving pattern;

FIG. 13B illustrates interpolation distances resulting from null data gaps in the line-interleaved pattern of FIG. 13A;

FIG. 14A illustrates a "four-row, interlocking-comb" transfer-gate line interleaving pattern;

FIG. 14B illustrates interpolation distances resulting from null data gaps in the line-interleaved pattern of FIG. 14A;

FIG. 16 illustrates an interconnection between column read-out lines and read-out logic elements within a line-interleaved embodiment according to FIG. 15;

FIG. 17 presents an exemplary timing diagram for read-out operations within a pair of interleaved rows shown in the embodiments of FIGS. 15 and 16;

FIG. 18 depicts a table of exemplary multiplexer states for the multiplexed group of staggered 1×4 pixel unit cells, (8 rows by 4 columns in this example);

FIG. 28 illustrates concurrent exposure of pixel subarrays A and B starting at video-frame-staggered times, for respective two-frame intervals, with three intermediate read-outs occurring during the exposure interval per subarray;

FIGS. 29A-29D illustrates overlapping spatial subframe exposure techniques in which the spatial subframes are exposed for different durations;

FIGS. 30A-30C illustrate further overlapping spatial subframe exposure techniques in which one of the spatial subarrays is continuously and conditionally read-out.

DETAILED DESCRIPTION

In various embodiments disclosed herein, the pixel array of an integrated-circuit image sensor is logically split into two or more spatial subarrays, one of which is oversampled (i.e., read-out multiple times) more than the other during a given frame interval. In a number of embodiments, for example, the pixel array is split into two spatially interleaved or interlocking subarrays in which a "long exposure" one of the subarrays is exposed for the entirety of the frame interval before being read-out, while the remaining "short exposure" subarray is exposed during each of multiple "subframe" intervals, the cumulative duration of which is shorter than the full frame interval and, like the long exposure, terminates with a readout at the end of the frame interval. By thresholding the readouts of non-final short-exposure subframes (i.e., reading out only those pixels of the short exposure subarray that have integrated a threshold level of charge—referred to herein as "conditional readout"), it becomes possible to vary the effective duration of the short exposure subframe, maintaining a dynamic range according to the shortest of the short exposure subframes as necessary to avoid pixel saturation in bright-light image regions, while at the same time reducing noise in low-light image regions by extending the effective duration of the short exposure to the cumulative subframe duration.

In other embodiments, two or more spatial subarrays of an integrated circuit image sensor are exposed in a pipelined or otherwise concurrent (or temporally overlapping) manner to generate respective, successive video image frames, with at least one of the subarrays being exposed for a duration that exceeds the video frame period. Either or both of the subarrays may be oversampled conditionally and/or unconditionally with respect to a given image frame, and pixel data obtained from the two subarrays during a period of concurrent exposure may be merged or otherwise combined to yield the video image frame corresponding to that period. These and other embodiments and features of high performance integrated-circuit image sensors are described below.

Line-Interleaved Conditional-Read Image Sensor

Figure 1:
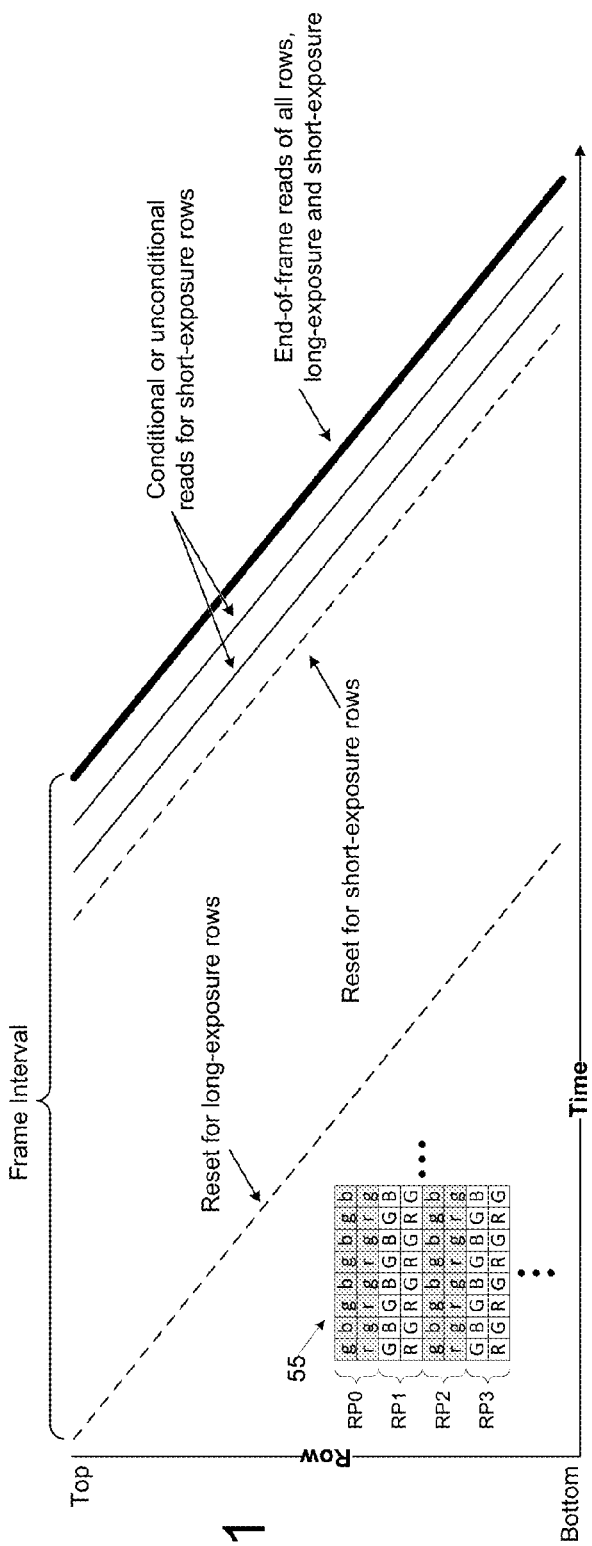
FIG. 1 illustrates an exemplary exposure profile for a line-interleaved image sensor in which a long-exposure pixel subarray is exposed for the entirety of a frame interval before being read out, while another pixel subarray is conditionally read-out in multiple subframes of a short exposure that terminates at the end of the frame interval.

FIG. 1 illustrates an exemplary exposure profile for a line-interleaved image sensor in which a long-exposure pixel subarray is exposed for the entirety of a frame interval before being read out, while another pixel subarray is conditionally read-out in multiple subframes of a short exposure that terminates at the end of the frame interval. In the embodiment shown, the pixel subarrays are assumed to correspond to alternating row pairs, with the short exposure occurring within even-numbered row pairs (RP0, RP2, . . . ), and the long exposure occurring within odd-numbered row pairs (RP1, RP3, . . . ) thus forming a row-pair interleaved pair of subarrays as depicted in pixel array fragment 55. As discussed below, the exposure/read-out profile shown and all others presented herein may be implemented with respect to any interleaved pattern of long-exposure and short-exposure pixels, including any of the exemplary line interleaved arrangements described below (a number of which do not require pixel rows to be organized in row pairs). In the specific implementation shown, the individual pixels are disposed in a Bayer color pattern with respect to a color filter array (or other element capable of controlling the portion of the visible spectrum to which a given pixel is predominantly exposed), though other color patterns may be employed in alternative embodiments, including patterns suitable to black and white or gray-scale exposure and/or nonvisible portions of the electromagnetic spectrum. Also, to distinguish the short- and long-exposure subarrays, pixels subject to the short exposure are shaded and marked in lower case letters according to color, while pixels subject to long exposure are unshaded and marked in capital letters according to color—a convention applied in various embodiments described below. Further, the exposure duration of a given pixel transpires from the time the pixel is reset (e.g., photodiode or other photodetector discharged to an initial state in preparation for charge/e$^-$ accumulation) to the time that same pixel is readout, with pixels in long-exposure rows being sequentially reset at the start of frame and sequentially read-out at end-of-frame to effect a rolling shutter. As shown, the short exposure pixel rows are reset as shown in the latter half of the frame interval (or may be held in the reset state up to that point in time) or otherwise at some point substantially after the start of frame so that the cumulative short exposure interval is substantially shorter than the long exposure interval.

In the embodiment of FIG. 1, the short exposure is temporally split evenly among three subframes, with each of the first two subframes being conditionally read-out at end-of-subframe (which marks the start of the next subframe), and the final subframe being read-out unconditionally at frame-end—concurrently or in interleaved manner with readout of the long-exposure pixel rows. As explained in further detail below, each conditional read-out operation non-destructively determines whether charge integrated within a given pixel exceeds a conditional-read threshold, reading out and resetting an overthreshold pixel while refraining from those operations with respect to an underthreshold pixel. By employing this conditional-read operation with respect to subframes of the short exposure, it becomes possible to dynamically change the exposure time pixel by pixel, extending the exposure time to the full duration of the short exposure interval for low-light regions of a scene, while limiting the exposure time for bright regions of the scene to a fraction of the short exposure time (33% in this case), all while maintaining a uniform cumulative short exposure interval. Accordingly, low-light noise may be substantially reduced without compromising dynamic range (and/or dynamic range may be extended without compromising noise performance).

Figure 2:
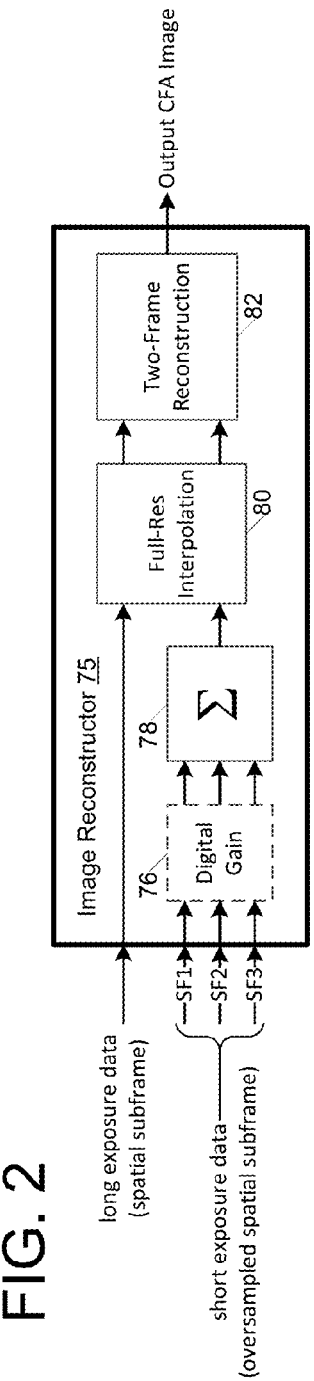
FIG. 2 illustrates an embodiment of an image reconstructor that applies the spatial and temporal subframe data generated in the exposure profile of FIG. 1 to reconstruct an output image.

FIG. 2 illustrates an embodiment of an image reconstructor 75 that applies the spatial and temporal subframe data generated in the exposure profile of FIG. 1 to reconstruct an output image. As shown, a total of four subframes of data are supplied to the reconstructor: a spatial subframe resulting from readout of the long exposure pixel subarray at the conclusion of the frame interval (the "long-exposure subframe"), and three spatial/temporal subframes read out from the short-exposure pixel subarray in successive temporal subframes that transpire successively during the short exposure frame interval ("short-exposure subframes"), the final one of which is read out contemporaneously with the long-exposure subframe at the conclusion of the frame interval. In the depicted embodiment, the short-exposure subframes are optionally scaled in a digital gain circuit 76 and then summed in summing logic 78. In the embodiment of FIG. 1, in which the short-exposure subframes have matching (identical) durations, the digital gain block may be omitted as each pixel value within a given short-exposure subframe has the same exposure value (EV—generally the product of pixel conversion gain and exposure time) and thus may be summed directly within summing logic 78. By contrast, in embodiments in which the short-exposure subframes have different exposure times (with correspondingly different analog gains so that all subframes have uniform exposure values), digital gain circuit scales pixel values within one or more of the short-exposure subframes, outputting scaled, uniform-total-gain (analog*digital) pixel values to summing logic 78. Also, while not specifically shown, the long exposure may also be scaled within the digital gain circuit as necessary to support reconstruction.

Still referring to FIG. 2, the summed short-exposure pixel data (the "composite short-exposure subframe") and long-exposure subframe are supplied to full-resolution interpolation logic 80 which generates interpolated values for the missing pixel data within each spatial subframe, effectively converting each spatial subframe into a full frame of data so that two full frames of data are delivered to two-frame reconstruction logic 82. Two-frame reconstruction logic 82 merges incoming long- and short-exposure frames pixel by pixel, for example, applying short-exposure pixel values alone in instances where pixel comparison indicates motion (i.e., difference between long-exposure pixel value and short-exposure pixel value, after being scaled to uniform EV, exceeds a threshold and therefore indicates motion in the scene), applying short-exposure data alone in saturated regions of the long exposure frame, and weighted-summing the short and long-exposure data in the remaining regions (i.e., those not saturated in the long exposure).

In one embodiment, digital gain circuit 76, summing logic 78 and full-resolution interpolation logic 80 are implemented by dedicated hardware, while two-frame reconstruction logic is implemented, at least in part, by a programmed processor (e.g., a multi-function image processor or dedicated reconstruction processor). More generally, any portion of the image reconstructor or other image processing circuitry herein may be implemented by dedicated hardware, programmed processor or any combination thereof. Further, any such hardware and/or programmed processor may be implemented in whole or part within the integrated circuit die containing the pixel array (i.e., the "imaging" chip) or on a separate integrated circuit die. In the case of a multi-die implementation, the component integrated circuit chips may be stacked or otherwise interconnected in a multi-die package.

FIG. 3 illustrates an alternative exposure profile for a conditional-read line-interleaved image sensor, in this case employing non-uniform subframe intervals within the short exposure to extend the overall short exposure interval without shortening the briefest of the subframe intervals. By this arrangement, low-light noise may be further reduced without compromising dynamic range. As in the exposure profile of FIG. 1, the long exposure extends for the full frame interval, while the short exposure extends for a substantially briefer time, with the last two of the three short-exposure subframes being shorter than the first. Note that, while implementing the shortest subframe(s) last reduces the amount of memory needed to buffer the pixel data for reconstruction and is the arrangement generally shown and described herein, subframes may be re-ordered in any practicable way in alternative embodiments (e.g., shortest subframe before one or more longer subframes). Also, each of the short exposure subframes may have a non-uniform duration relative to the other two or the first two of the subframes may have uniform durations shorter or longer than the last subframe. Further in the embodiment shown, the pixel analog gain (i.e., conversion gain, source-follower gain and analog gain from gain stages, also referred to herein as ISO gain) for the longer short-exposure subframe is reduced relative to the shorter subframes to yield matched exposure values for each short-exposure subframe and thus permit simple (unscaled/unweighted) summation of subframe data. While the analog gain may vary for each subframe (long and short), the total gain (analog gain*digital gain) is uniform for each subframe to enable combination within the reconstructor of FIG. 2. The digital gain circuit 76 has been added for this purpose. In alternative reconstructor embodiments, the subframes may have non-uniform exposure values.

The short exposures shown in FIGS. 1 and 3 may have more or fewer than the three subframes shown, with the number of subframes being increased up to the maximum practical read-out rate within the image sensor, given a set of timing and/or resolution parameters and possibly the power available at time of image capture. FIG. 4, for example, shows a line-interleaved read-out in which seven subframe readouts are executed per short-subframe, so that a total of eight subframes are read-out per frame interval—an exposure profile that permits a higher dynamic range (i.e., shorter subframe durations) and/or lower noise (longer cumulative short subframe duration) compared to the three-subframe embodiment shown in FIG. 1. In either case, assuming a 30 frame-per-second (fps) frame rate (i.e., image frame period=1/30 second), the eight-subframe readout corresponds to an effective frame rate of 120 frames per second (i.e., as each subframe is read-out from half the pixels in the pixel array), whereas the four subframes per frame interval in the embodiments of FIGS. 1 and 3 (i.e., 1 long-exposure subframe, three temporal subframes per short-exposure) corresponds to an effective frame rate of 60 frames per second.

Conditional-Read Image Pixel Array

FIG. 5 illustrates embodiments of a conditional-read pixel 100 and column read-out logic 150 in which a non-destructive overthreshold detection operation is executed to enable conditional-read/reset in conjunction with correlated double sampling. As explained more fully below, the overthreshold detection involves a limited read-out of charge integrated within the pixel's photodiode 110 which, if determined to meet an overthreshold condition, will trigger a complete read-out of the charge collected in the photodiode. That is, pixel 100 is read-out in a progression from a limited overthreshold detection read-out to a complete read-out, the latter being conditional according to the overthreshold detection result.

In the embodiment of FIG. 5, conditional-read pixel 100 includes a transfer gate 101 disposed between a photodiode 110 (or any other practicable photosensitive element) and floating diffusion node 112, and a transfer-enable transistor 103 coupled between a transfer-gate row line (TGr) and transfer gate 101. The gate of transfer-enable transistor 103 is coupled to a transfer-gate column line (TGc) so that, when TGc is activated, the potential on TGr is applied via transfer-enable transistor 103 to the gate of transfer-gate 101, thus enabling charge accumulated within photodiode 110 to be transferred to floating diffusion 112 and sensed by the pixel readout circuitry. More specifically, floating diffusion 112 is coupled to the gate of source follower 105 (an amplification and charge-to-voltage conversion element), which is itself coupled between a supply rail ($V_{DD}$ in this example) and a read-out line, Vout, to enable a signal representative of the floating diffusion potential to be output to column read-out logic 150.

In the implementation shown, column read-out logic 150 includes a sample-and-hold circuit block 153 (e.g., including switches and capacitive elements for sampling and temporarily holding analog signals output onto read-out line, Vout) and a comparator/ADC circuit block 155. During an overthreshold detection operation, a read-enable signal (TGcEn) is pulsed concurrently with application of partial-on potential ($V_{TG-Partial}$) on transfer gate line TGr. The read-enable pulse passes through logic OR gate 159 to drive TGc high, thus switching on transfer-enable transistor 103 so that $V_{TG-Partial}$ is applied to transfer gate 101, thereby enabling a partial charge transfer to floating diffusion 112 as discussed below. Signal levels representative of the charge state of floating diffusion 112 (and thus photodiode 110 following the partial charge-transfer operation) are captured within sample and hold block 153 and supplied to comparator 157 within comparator/ADC block 155. The output of the comparator is supplied, via logic OR gate 159, to the TGc control line so that, after the read-enable signal (TGcEn) goes low, TGc either remains high or goes low according to whether the charge integration state within photodiode 110 exceeds or does not exceed a conditional-read threshold ("CR Threshold"). If an overthreshold condition is detected (i.e., TGc remains asserted after TGcEn goes low), a subsequent assertion of a full-transfer control potential, $V_{TG-Full}$, on control line TGr enables a full charge transfer from the photodiode to floating diffusion and thus a full read-out of the photodiode state. More specifically, Vout is driven according to floating diffusion charge level and an analog-to-digital conversion (ADC) operation is selectively enabled within an ADC circuit (not specifically shown) of comparator/ADC logic 155.

Referring again to conditional-read pixel 100, a row-select transistor 107 is coupled between the source follower 105 and the read-out line (Vout) to enable multiplexed access to the column read-out line by respective rows of pixels. That is, row-select lines ("RS") are coupled to the control inputs of row-select transistors 107 within respective rows of pixels and operated on a one-hot basis to select one row of pixels for sense/read-out operations at a time. A reset transistor 109 is also provided within the pixel to enable the floating diffusion to be switchably coupled to the supply rail (i.e., when a reset-gate line (RG) is activated) and thus reset. The photodiode itself may be reset along with the floating diffusion by fully switching on transfer gate 101 (e.g., by asserting TGc while TGr is high) and reset transistor 109 concurrently, or by connecting the photodiode to a reset-state floating diffusion.

Still referring to FIG. 5, various charge-transfer control arrangements may be used instead of transfer-enable gate 103. In one embodiment, shown for example at 165, transfer-enable transistor 103 is replaced by a split transfer gate in which part of the gate is controlled by TGc and the other part by TGr, requiring both signals to be at least partially asserted in order to lower the electrostatic barrier between the photodiode and floating diffusion. In another embodiment, shown at 167, the TGc potential may be directly coupled to a pinning layer of photodiode 110, thus raising and lowering the potential of the photodiode relative to the electrostatic barrier formed by transfer gate 101. In yet another embodiment, transfer-enable transistor 103 may be implemented by a P-type transistor (as opposed to the N-type transistor shown in FIG. 5), thus enabling negative voltages to be applied via TGr, for example, to more fully block the transfer path between photodiode 110 and floating diffusion 112. In that case, OR gate 159 may be replaced by a NOR gate to establish the desired active-low TGc assertion state.

To reduce pixel footprint (i.e., die consumption area), a single floating diffusion node and corresponding read-out/reset circuitry (i.e., transistors 105, 107, 109) may be shared by two or more pixels in a "pixel unit cell," thus reducing the per-pixel transistor count and enabling charge-binned (reduced spatial resolution) imaging modes. As shown in detail view 115, for example, a single floating diffusion node 112s is shared by a column of four pixels (denoted by respective photodiodes PD1-PD4), as is read-out circuitry formed by amplifier transistor 105s and read-select transistor 107s and reset transistor 109s. In this "1×4" pixel unit cell (various others are possible, including configurations that span two or more columns of pixels), four pixels are implemented by a total of eleven transistors (four of which are transfer gates 101), thus effecting an average transistor count of 2.75 (i.e., "2.75T") per pixel.

FIG. 6 is a timing diagram illustrating an exemplary pixel cycle within the conditional-read pixel of FIG. 5. As shown, the pixel cycle is split into five intervals or phases corresponding to distinct operations executed to conditionally read out or refrain from reading out the pixel state. In the first phase (phase 1), a reset operation is executed within the photodiode and floating diffusion by concurrently asserting the appropriate logic high signals on the TGr, TGc and RG lines to switch on transfer-enable transistor 103, transfer gate 101 and reset transistor 109, thereby switchably coupling photodiode 110 to the supply rail via transfer gate 101, floating diffusion 112 and reset transistor 109 (the illustrated sequence can begin with an unconditional reset (e.g., at the start of a frame interval), and can also begin from a preceding conditional read-out/reset operation). To conclude the reset operation, the TGr and RG signals (i.e., signals applied on like-named signal lines) are lowered to appropriate "off" levels, thereby switching off transfer gate 101 (and reset transistor 109) so that the photodiode is enabled to accumulate (or integrate) charge in response to incident light in the ensuing integration phase (phase 2). Lastly, although the row-select signal goes high during the reset operation shown in FIG. 6, this is merely a consequence of an implementation-specific row decoder that raises the row-select signal whenever a given row address is decoded in connection with a row-specific operation (e.g., raising the TGr and RG signals during reset directed to a given row). In an alternative embodiment, the row decoder may include logic to suppress assertion of the row-select signal during reset as indicated by the dashed RS pulse in FIG. 6. Additionally, the reset transistor may be left on or partially on during the integration phase.

At the conclusion of the integration phase, the floating diffusion is reset (i.e., by pulsing the RG signal to couple the floating diffusion to the supply rail) and then sampled by a sample-and-hold element within the column read-out circuit. The reset and sample operation (shown as phase 3 in FIG. 6), in effect, samples the reset level of the floating diffusion and is executed in the embodiment of FIGS. 5 and 6 by asserting the row-select signal (RS) for the pixel row of interest while pulsing a reset-state sample-and-hold signal (SHR) to convey the state of the floating diffusion to the sample-and-hold element (e.g., a switch-accessed capacitive element) within the column read-out circuit via read-out line, Vout.

After acquiring the reset sample in phase 3, an overthreshold detection operation is executed in phase 4 by raising the TGr line to the partially-on, "overthreshold-detection" potential, $V_{TG\text{-}Partial}$, concurrently with switching on transfer-enable transistor 103 (i.e., by asserting a logic high TGc signal as discussed above, although in this embodiment TGc is already on). By this operation, $V_{TG\text{-}Partial}$ is applied to transfer gate 101 to switch the transfer gate to a "partial on" state ("TG partial on"). Referring to FIG. 7, electrostatic potential diagrams for a photodiode (a pinned photodiode in this example), transfer gate and floating diffusion (corresponding to photodiode 110, transfer gate 101 and floating diffusion 112 of FIG. 5) are shown at 181 and 183 to illustrate underthreshold (low-light) and overthreshold (bright light) read-out operations, respectively. Note that the depicted levels of electrostatic potential are not intended to be an accurate representation of the levels produced in an actual or simulated device, but rather a general (or conceptual) representation to illustrate the operation of the pixel read-out phases.

Starting with underthreshold/low-light example 181, the level of charge accumulated within the photodiode at the time of the overthreshold detection operation (phase 4) does not rise to the threshold level required for charge to spill over (i.e., be transferred) to the floating diffusion via the shallow channel potential (187) of the partially-on transfer gate. Accordingly, because the accumulated charge level does not exceed the transfer threshold (or spillover threshold) established by application of $V_{TG\text{-}Partial}$ to the control node of transfer gate 101, there is no charge transfer from the photodiode to the floating diffusion and the accumulated charge instead remains undisturbed within the photodiode. By contrast, in overthreshold/bright-light example 183, the higher level of accumulated charge does exceed the transfer threshold so that a portion of the accumulated charge (i.e., that subset of charge carriers that are above the transfer gate partially-on electrostatic potential) spills over into floating diffusion node 112, with the residual accumulated charge remaining within the photodiode as shown at 188.

Still referring to FIGS. 6 and 7, prior to conclusion of overthreshold detection phase 4, the charge level of the floating diffusion is sampled and held within a signal-state sample-and-hold element (i.e., in response to assertion of signal SHS) to yield a threshold-test sample—the difference between the signal-state sample and the previously obtained reset-state sample—to be evaluated with respect to a conditional-reset threshold as described above. In one embodiment, the conditional-read threshold is an analog threshold (e.g., to be compared with the threshold-test sample in a sense amplifier in response to assertion of a compare/convert strobe signal) set or programmed to a setting above the sampling noise floor, but low enough to enable detection of minute charge spillover via the shallow transfer gate channel. Alternatively, the threshold-test sample may be digitized in response to assertion of the compare/convert signal (e.g., within an analog-to-digital converter that is also used to generate the finalized pixel sample value) and then compared with a digital conditional-reset threshold, again, set (or programmed to a setting) above the noise floor, but low enough to enable detection of trace charge spillover. In either case, if the threshold-test sample indicates that no detectable spillover occurred (i.e., threshold-test sample value is less than conditional-reset spillover threshold), then the photodiode is deemed to be in the underthreshold state shown in the low-light example of FIG. 7 and the TGc line is held low in the ensuing conditional read-out phase (phase 5, the final phase) to disable transfer gate 101 for the remainder of the conditional read-out operation—in effect, disabling further read-out from the photodiode and thus enabling the photodiode to continue integrating charge without disruption for at least another sampling interval. By contrast, if the threshold-test sample indicates a spillover event (i.e., threshold-test sample greater than conditional-reset/transfer threshold), then the TGc line is pulsed high, (or alternately remains high) during the conditional read-out phase concurrently with application of a fully-on, "remainder-transfer" potential, $V_{TG\text{-}Full}$, to the TGr line, thereby enabling the remainder of the charge (i.e., charge 188 as shown in the bright-light example of FIG. 7) within photodiode 110 to be transferred to floating diffusion 112 via the full-depth transfer-gate channel (189) so that, between the overthreshold transfer in phase 4 and the remainder transfer in phase 5, the charge accumulated within the photodiode since the hard reset in phase 1 is fully transferred to the floating diffusion where it may be sensed in a pixel read-out operation. In the embodiment shown, the pixel-readout operation is effected by pulsing the SHS signal and compare/convert strobe in sequence during conditional read-out phase 5, though either or both of those pulses may optionally be suppressed in absence of an overthreshold detection. Note that conditional read-out of the photodiode (i.e., effected by asserting TGc in conjunction with application of $V_{TG\text{-}Full}$ on TGr) effectively resets the photodiode (i.e., drawing off all charge to the floating diffusion), while suppression of the conditional read-out leaves the integration state of the photodiode undisturbed. Accordingly, execution of the conditional read-out operation in phase 5 conditionally resets the photodiode in preparation for integration anew in the succeeding sampling interval (i.e., the succeeding "subframe interval" or "subframe" for short) or refrains from resetting the photodiode to enable cumulative integration in the subsequent sampling interval. Thus, in either case, a new integration phase follows phase 5, with phases 2-5 being repeated for each subframe of the overall frame (or exposure) interval, before repeating the hard reset in a new frame. In other embodiments, where cumulative integration is permitted across frame boundaries, the hard reset operation may be executed to initialize the image sensor and omitted for an indeterminate period of time thereafter. Also, instead of the hard reset operation shown in phase 1, an unconditional read/reset may be effected following the final subframe of a frame interval or, if desired, in any non-final subframe by unconditionally asserting TGc during read-out phase 5 (i.e., asserting TGc in phase 5 without regard to the result of the overthreshold detection in phase 4.

Figure 8:
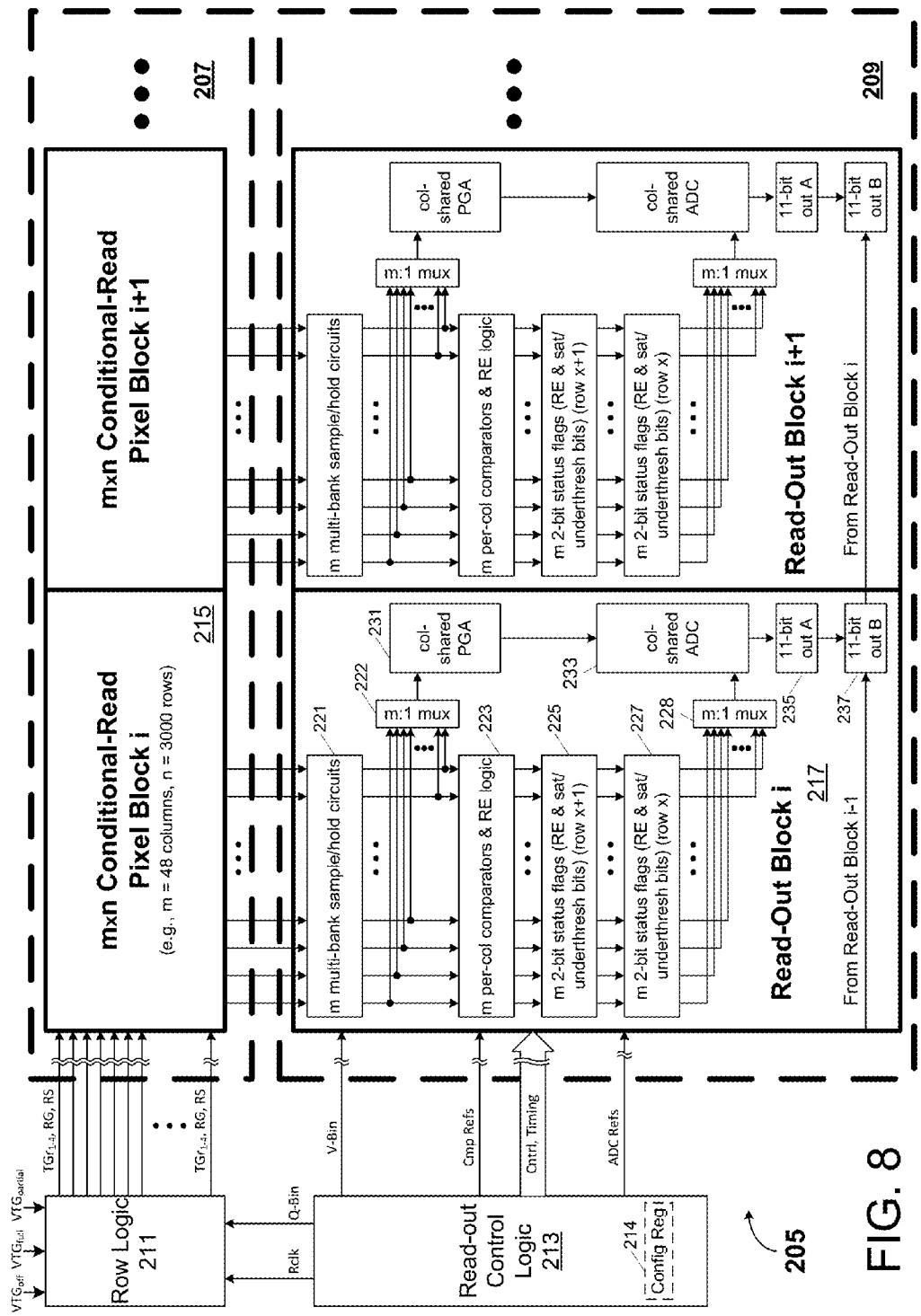
FIG. 8 illustrates an embodiment of an image sensor having a conditional-read pixel array, column read-out circuitry, row logic and read-out control logic.

FIG. 8 illustrates an embodiment of an image sensor 205 having a conditional-read pixel array 207, column read-out circuitry 209, row logic 211 and read-out control logic 213. In the example shown, pixel array 207 is organized in a number of pixel blocks 215, only two of which are depicted (i.e., pixel block 'i' and pixel block 'i+1'), with each pixel block containing m columns and n rows of conditional-read pixels (e.g., m=48, n=3000, though other row/column dimensions may apply). Column read-out circuitry 209 is similarly organized in a number of read-out blocks 217 (only two of which are shown), each coupled to receive output signal lines (i.e., data lines) from a respective pixel block 215.

Though not specifically shown, each column of pixel array 207 is populated by shared-floating-diffusion ("shared FD") pixels in which every four pixels form a one-column by four-row (1×4) "unit pixel cell" as shown in FIG. 9. As explained below, the shared floating diffusion arrangement permits charge integrated within pixels of the same unit pixel cell to be combined in a "charge binning" or "charge summing" operation, in effect exchanging spatial resolution for increased sensitivity. Similarly, though not shown, sample and hold circuitry within each read-out block includes switching elements to enable "voltage-binning" or "voltage averaging" of selected pixels in different pixel unit cells, again exchanging spatial resolution for sensitivity.

In the example shown in FIG. 9, pixels (disposed within 1×4 pixel unit cells 250) are disposed between a color filter array (CFA) that illuminates individual pixels with light corresponding to different wavelength bands (i.e., different colors)—in this case establishing a Bayer pattern in which every other pixel in the row and column direction is exposed to light in the "green" wavelength band (G), every other pixel in even numbered pixel rows is exposed to light in the "red" wavelength band (R) and every other pixel in odd numbered pixel rows is exposed to light in the "blue" wavelength band (B). As shown, pixels within the same color plane (i.e., "green pixels," "red pixels," or "blue pixels") may be selectively charge binned and/or voltage binned to enhance sensitivity. Thus, returning to FIG. 8, pixel array 207 may be selectively operated in charge-binned and/or voltage-binned read-out modes during all or selected subframes of an image frame interval in accordance with one or more binning control signals (e.g., "Q-Bin" and "V-Bin") from read-out control logic 213, thereby enabling binning operations in one or more spatial or temporal subframes acquired during a given frame interval. As discussed below, pixel unit cells constituted by more or fewer pixels than shown in FIG. 9 (and spanning different numbers of rows and/or columns) may be implemented in various embodiments.

Still referring to FIG. 8, row logic 211 outputs a shared row-select signal (RS) and reset-gate signal (RG) to each row of quad-pixel cells, and outputs independent row transfer-gate control signals ($TGr_1$-$TGr_4$) to drain terminals of respective transfer-enable transistors (or directly to transfer-gate terminals in a split-gate embodiment) within individual pixels. Thus, row logic 211 may be implemented generally as described in reference to FIG. 25 (i.e., with one row-select and reset-gate signal per each group of four rows per the bin-capable option described above). In an implementation in which row logic 211 sequences incrementally through the rows of pixel array 207 (e.g., pipelining reset, integration and progressive read-out operations with respect to the rows of pixel array 207 such that one row is read-out after another), row logic 211 may include circuitry to assert the RG, RS and TGr signals at the appropriate time for each row, for example, synthesizing those signals with respect to a row clock (Rclk) from read-out control logic 213. Alternatively, row logic 211 may receive individual timing signals corresponding to each or any of the RG, RS and TGr signals, multiplexing any individual enable pulse onto the corresponding RG, RS, or TGr lines of a selected row at the appropriate time.

In one embodiment, row logic 211 receives transfer-gate control voltages corresponding to the off, partially-on and fully-on states shown in FIGS. 6 and 7 (i.e., $VTG_{off}$, $VTG_{partial}$, $VTG_{full}$) from an on-chip or off-chip programmable voltage source, switchably coupling each of the different control voltages to a given transfer-gate row line at a deterministic time, for example, as shown in FIG. 6. The $VTG_{partial}$ voltage may be calibrated (e.g., using a 'dark' column of reference circuits included within pixel array 207 in one implementation) to compensate for control-voltage and/or performance variations (i.e., non-uniformity) across the pixel array.

Continuing with FIG. 8, each read-out block 217 includes a set of m (per-column) multi-bank sample and hold circuits 221, a corresponding set of m comparators and read-enable/dilation logic circuits 223, m:1 multiplexers 222 and 228, column-shared programmable gain amplifier 231 and column-shared ADC circuit 233. In the embodiment shown, pairs of digital buffers are provided to store read-out status flags and ADC output values. More specifically, a pair of flag buffers 225 and 227 are provided to double-buffer per-column read-out status flags (i.e., a read-enable bit and an above/below range bit, RE and AB, for each of m pixel columns, with RE signifying whether a corresponding pixel value is valid, and AB indicating reason for invalidity (e.g., underthreshold or saturated), if any), with flag buffer 225 storing the status flags for row x+1, and flag buffer 227 storing status flags for row x, thus enabling status flag generation (i.e., threshold-comparison operations) with respect a given row (x+1) while the status flags for the prior row (x) are delivered one after another (via multiplexer 228) to column-shared ADC 233 to support selective ADC operations as discussed above. Read-out control logic 213 (which may include a configuration register 214 to enable programmable selection of configuration options) outputs comparator references (Cmp Refs), control and timing signals (Cntrl, Timing) and ADC refs (ADC Refs) to the read-out blocks 217, together with the voltage-bin mode signal (V-Bin) mentioned above. Read-out control logic 213 may also output the above-described row clock (Rclk), as well as a charge-bin mode signal (Q-Bin) to row logic 211, thus enabling the sequencing logic therein to assert TGr signals in parallel or staggered fashion according to the specified charge binning mode.

Instead of storing m column ADC outputs in respective storage locations within a line memory (an alternative embodiment), and then shifting out a sequence of ADC values corresponding to an entire pixel row, a single-column ADC output storage buffer pair 235/237 (i.e., an 11-bit storage element in this case to permit storage of a 10-bit ADC value and logic '1' read-enable flag or a logic '0' read-enable flag together with an AB flag) is provided to enable double-buffering of ADC values generated in succession for respective pixel columns. More specifically, output-stage buffer 237 is provided to store the ADC value for a given pixel column and deliver that ADC value to downstream logic (including the PHY), concurrently with generation of the ADC value for a subsequent pixel column and storage of that subsequent-column ADC value in input-stage buffer 235. In the embodiment shown, the output-stage buffers 237 for respective read-out blocks 217 are coupled in an output shift register to enable sequential output of per-block ADC output values (e.g., at a rate of PB times the per-column ADC output rate, where PB is the number of pixel blocks in the pixel array) to downstream logic. Consequently, the stream of ADC output values delivered to downstream logic (including circuitry within an off-chip image processor) are column interleaved, with each set of K ADC output values including single value from each of K pixel blocks (with m sets of K ADC output values being output in sequence). In alternative embodiments, the output-stage buffers or any number of groups of output buffers may deliver output values in parallel to downstream logic instead of delivering one pixel column read-out result at a time.

Alternative Line Interleaving/Interlocking Patterns

As discussed in reference to FIG. 2, full-resolution interpolation logic 80 within image reconstructor 75 generates interpolated values for the missing pixel data within each spatial subframe—operations dependent on the interpolation distances between nearest same-color-plane data within either spatial subframe and thus on the pattern of line interleaved pixels. Even in embodiments that do not employ two-frame reconstruction approach described in reference to FIG. 2, interleave-pattern-dependent interpolation may still be employed with respect to the long-exposure and/or composite-short-exposure subframe in cases where the short exposure pixel data is invalid (e.g., low-light signal below noise floor, so no ADC operation performed) or the long exposure pixel data is invalid (e.g., bright-light yields eclipsed pixel or signal level above ADC saturation level, so no ADC operation performed), respectively.

Figure 10B:
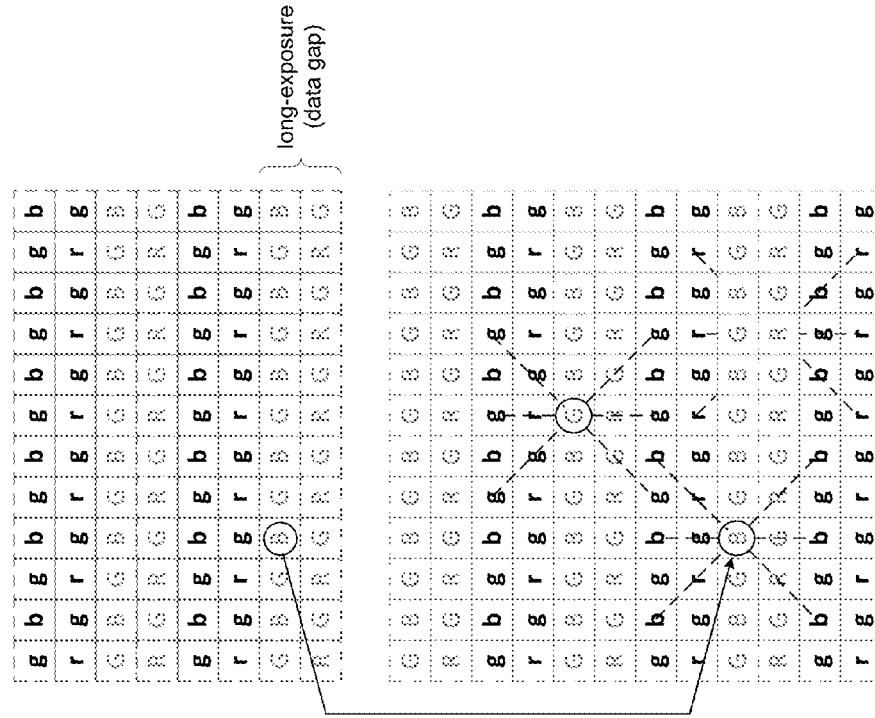
FIGS. 10A and 10B illustrate interpolation distances for row-pair line interleaving in cases where the short-exposure or long-exposure pixel data is invalid.
Figure 10A:
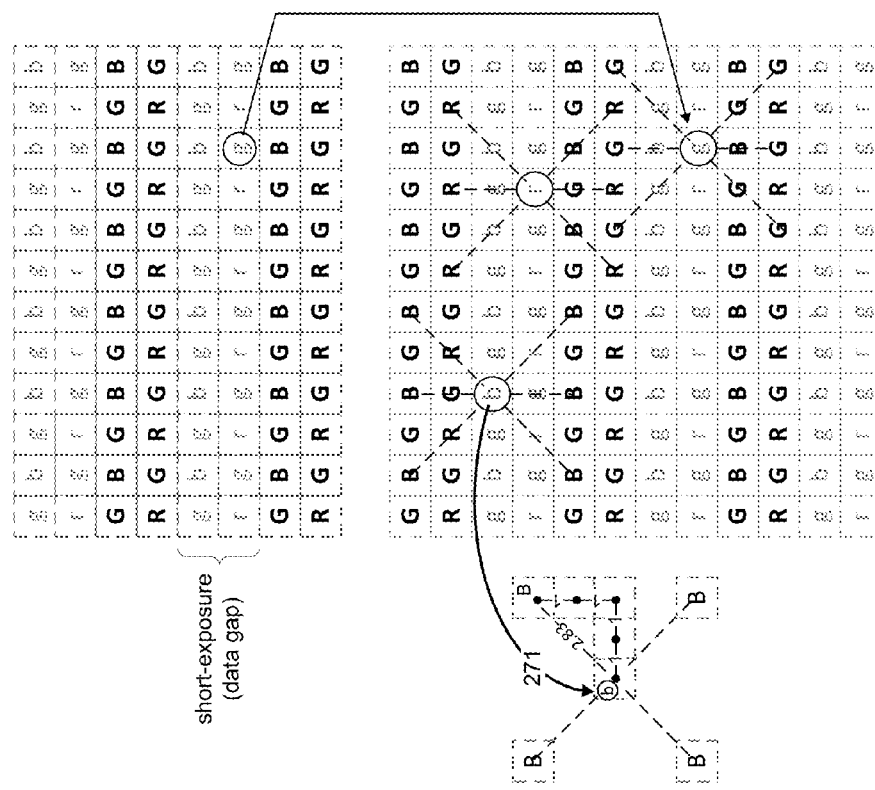

FIGS. 10A and 10B illustrate interpolation distances for the row-pair line interleaving pattern for long-exposure pixels and short-exposure pixels, respectively. As shown, upper case letters refer to the long exposure pixels and lower case letters refer to the short exposure pixels. The circled "synthesized" pixel indicates a pixel site for which there is no same-exposure data (i.e., no long-exposure data in the case of long-exposure interpolation, and no short-exposure data in the case of short-exposure interpolation)—and the dotted lines show nearest neighboring pixels that can be interpolated to synthesize data for that pixel site.

As shown, the horizontal (same-row) interpolation distance for the red and blue color planes is infinite for both long and short exposures (i.e., there are no neighboring valid pixels in the horizontal direction), while the vertical interpolation distance is two pixels. The interpolation distance in the diagonal direction is 2.83 pixels, a Pythagorean calculation illustrated at 271.

For the green color plane, (both long and short exposures), the horizontal interpolation distance is infinite for both long and short exposures, and the vertical interpolation distance in the vertical direction is 2 pixels. The interpolation distance in the diagonal direction is 2.83 pixels, and possibly 1.41 pixels in one diagonal direction.

In a number of embodiments presented below, patterning of pixels within long-exposure and short-exposure subarrays is modified relative to the interleaved row-pairs shown in FIGS. 1, 10A and 10B to improve partial-to-full-frame interpolation results. In particular, the interleaving or interlocking patterns disclosed below seek to limit large gaps between available pixel data and have generally been designed to have one or more of the following attributes:

No large vertical or horizontal gaps or holes (i.e., corresponding to omitted short-exposure pixels when interpolating long-exposure data and, conversely, to omitted long-exposure pixels when interpolating short-exposure data)—stated, no clumps of valid pixel data)

Shortest possible interpolation distance in all directions, (H, V and D) for green Spatially symmetric interpolation distances for all green pixels Reasonable interpolation distance in all directions for R and B Spatially symmetric interpolation distances for all R and B pixels Simple hardware implementation for addressing and read-out circuits Compatible with charge domain binning and shared amplifier pixel architectures Pattern 1—Serpentine TG Line—Single-Line Interleaved Pixel Subarray Pattern FIG. 11A illustrates a single-line interleaved pixel subarray pattern in which the transfer-gate control line ("TG line") is routed in serpentine fashion between pixels in adjacent rows, alternately connecting to transfer gates of column-adjacent pixel pairs in each of two rows (i.e., connecting to two pixels in a first row, then to two pixels in the second row, and then back to another pixel pair in the first row, etc.). One benefit of this serpentine TG line routing, and single line interleaved pattern is a smaller gap size in very bright and dark regions of the scene than the dual-line (i.e., row-paired) interleaved pattern shown in FIGS. 1, 10A and 10B. More specifically, as shown by the synthesized pixel regions ("gaps") in detail view 301, the maximum gap size resulting from data loss within one pixel subarray (short-exposure data lacking in this example) is 1×2 pixels instead of the 2×2 pixel gap in the dual-line arrangement discussed above.

As shown by the interpolation-distance plots in FIG. 11B, the serpentine TG pattern does not yield a directionally symmetric or spatially symmetric interpolation pattern for the invalid green pixels. The horizontal interpolation distance is two pixels. The vertical interpolation distance is infinite. The diagonal interpolation distance is not symmetric being 1.41 and 2.82 depending on the diagonal direction, but can be made to be symmetric by extending the diagonal interpolation distance in one diagonal direction to use the next diagonally adjacent pixel. The red and blue pixels have a symmetric interpolation pattern, with 2.0 and 2.82 in the horizontal and diagonal directions respectively.

Pattern 2—Twisted-Pair, Interlocked L—Single-Line Interleaved Pixel Subarray Pattern FIG. 12A illustrates a "twisted-pair, interlocked-L" transfer-gate line interleaving pattern. This pattern has a zig-zag gap as shown in detail view 341. As shown in FIG. 12B, the interlocked-L pattern has better resolution in the green channel, with 4 diagonal pixels 1.41 pixels away. The short and long exposure pixels also are in an interleaved checkerboard pattern. The other patterns have at best two interpolation-source pixels 1.41 pixels away. For the red and blue pixels the interpolation distance is 2 pixels in the horizontal and vertical directions. Green resolution is generally more important as is know from the Bayer pattern and lower resolution of chrominance in final image rendering. All pixels in a single exposure plane are on a square grid which provides the best resolution and simple interpolation.

Pattern 3—x3 Twisted-Pair—Single-Line Interleaved Pixel Subarray Pattern

A third "×3 twisted-pair" transfer-gate line interleaving pattern is shown in FIG. 13A. Unlike the previous patterns, the ×3 twisted pair pattern yields non-uniform color plane densities for the different exposure times, (i.e. unequal numbers of G, R and B pixels in each pixel subarray). Referring to detail view 361, the long exposure subarray has four green pixels for each red and blue pair (the short-exposure subarray is only ⅓ green instead of ⅔), thus yielding an improved luminance signal in the dark regions of the image. In an alternative embodiment, the predominantly-green subarray may be applied in the short exposure to improve the luminance signal in dark regions, potentially yielding better motion detection results. As can be seen, 3×1 gaps result in the absence of data from either subarray.

As FIG. 13B demonstrates, the ×3 twisted-pair interpolation distances and patterns are non-uniform for different same-color-plane pixels within a given subarray, long-exposure or short. For example, the interpolation distance is 1.41 pixels in four directions for some long-exposure (or short-exposure) green pixels, and a mix of 1.41 and 2.83 distances for other long-exposure (or short-exposure) green pixels. The same non-uniformity holds for red and blue pixels within the same exposure, with the interpolation distance in some cases being 2.83 pixels in four directions.

Pattern 4—Four-Row Interlocked Comb—Single-Line Interleaved Pixel Subarray Pattern FIG. 14A illustrates a "four-row, interlocking-comb" transfer-gate line interleaving pattern is shown in FIG. 14A. TG line wiring (and thus the pixels that form a given "pixel row") follows the shaded and unshaded line patterns for the long and short exposures, respectively. The gaps that result in the absence of data from either the long-exposure or short-exposure subarray form a comb pattern that is 1 row with alternating 2 pixels in the column direction, as shown in detail view 381.

FIG. 14B illustrates interpolation patterns and distances for the four-row interlocked-comb readout pattern. The resolution in the green channel is ideal with 1.41 pixel distance in four directions, a symmetric pattern for all green pixels, and green pixels are on a square grid. The interpolation distance for red and blue pixels is also symmetric with 2.82 pixel distance in four diagonal directions, and 2.0 pixels in the vertical direction. The distance is infinite in the horizontal direction. Also, although the interpolation distance is larger for the red and blue pixels than that of the pattern in FIG. 12B, the TG wiring pattern may be implemented in a single interconnect layer as the TG lines for the short and long exposure subarrays do not cross over one another, thus potentially reducing noise-inducing coupling capacitance that may otherwise be present interleaving arrangements with crossed TG lines.

Hardware Implementation of Interleaving Patterns:

The pixel array and readout hardware for the line interleaving patterns shown in FIGS. 11A and 13A are straightforward. Both the pixel readout and analog and digital readout use row-by-row, single read-out line per column architectures. By contrast, the line interleaving arrangements shown in FIGS. 12A and 14A have adjacent pixels in the same column with the same exposure time and thus require hardware changes within the pixel array wiring and column readout circuits to enable concurrent read-out of pixels coupled to a given TG line (i.e., a "logical" row of pixels, which may include pixels in more than one physical row of the array, including two pixels in the same physical column of the array).

In general, it is desirable to have pixels of the same exposure time be readout in a rolling row fashion, especially when rolling row interleaved timing is used. Additionally, in at least some embodiments, it is desired to have the readout operate with a maximum of two TG signal lines per row and preferably one TG single line per row. Further it is desired to have a single column output line for each column in the array, (i.e. if there are n columns in the array, there are n column output wires).

Figure 15:
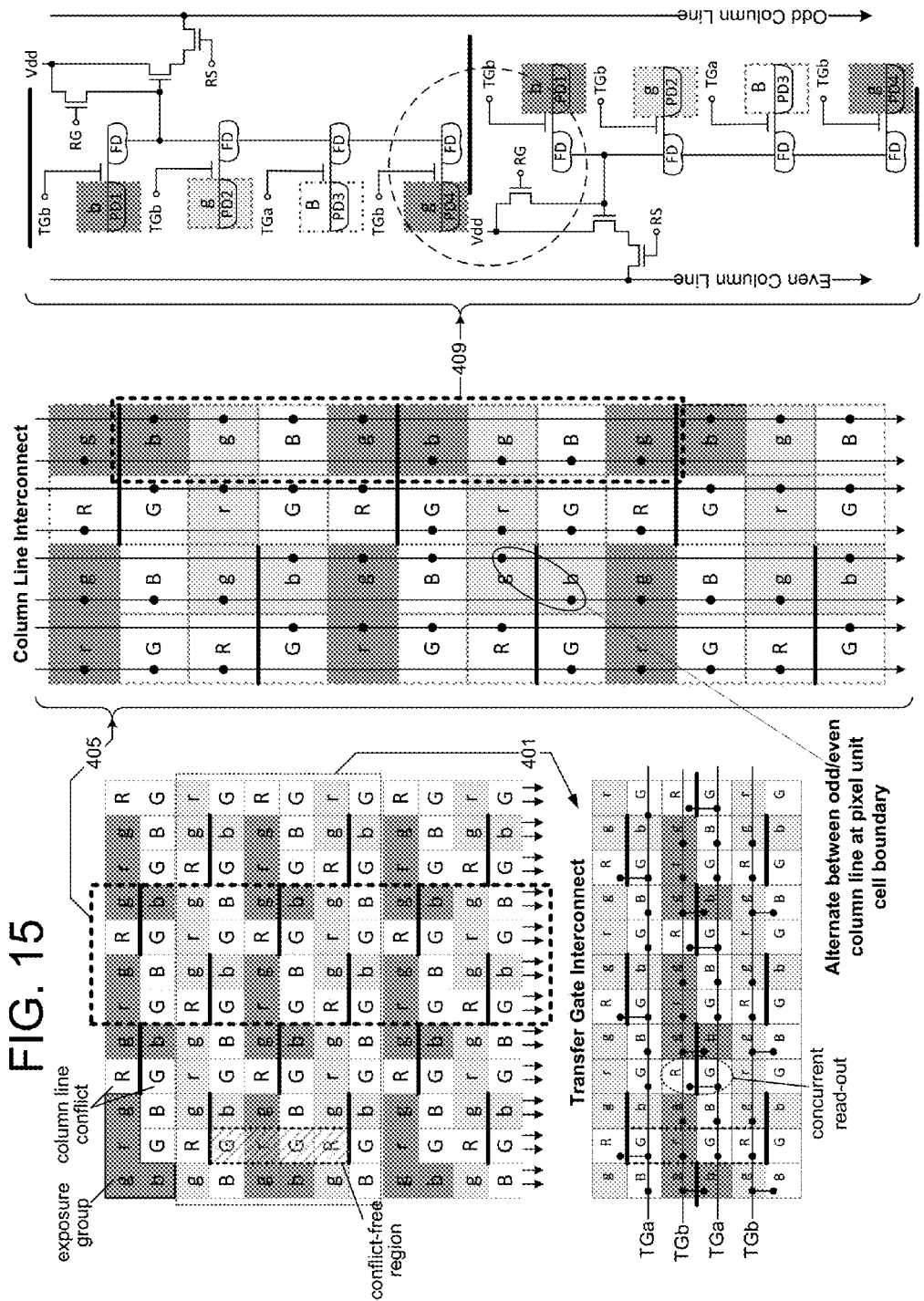
FIG. 15 illustrates an exemplary interleaved integration time pattern for the twisted-pair, interlocked L TG line arrangement of FIGS. 12A and 12B.

FIG. 15 illustrates an exemplary interleaved integration time pattern for the twisted-pair, interlocked L TG line arrangement of FIGS. 12A and 12B. As in other embodiments described below, shaded regions correspond to short-exposure pixels and unshaded regions correspond to long-exposure pixels, with the shaded regions split between light and dark shading to enable distinction between short-exposure pixels coupled to different TG lines. First, it is assumed that a shared amplifier pixel architecture is used with at least two rows of sharing and assuming one transfer gate signal line (TG) per row. The dark black horizontal lines indicate boundaries between unit pixel cells (i.e., groups of pixels sharing a floating diffusion, source follower, read-select and reset transistors) needed to avoid reading out two pixels in the same column simultaneously (i.e., to avoid having two adjacent pixels in the same column with the same exposure time connected to the same source follower).

As FIG. 15 demonstrates, a number of different pixel unit cell architectures can be deployed (e.g. 1×2, 2×2, 1×4, 2×4, as well as combinations of diagonally interconnected pixels as discussed below), as numerous unit cell configurations will fit inside the two-column by four-row envelope. Also note that the unit cell boundary is two columns wide and is in a two row staggered pattern.

1×4 Shared Pixel Architecture:

In the embodiment of FIG. 15, a 1×4 (one-column by four-row) pixel unit cell is implemented, with two such pixel unit cells being disposed side by side within the 2×4 unit cell envelope. As indicated by the different grades of long-exposure shading (and shown explicitly in detail view 401), one transfer-gate line is provided per row of pixels, with that line being twisted with a row-adjacent line to form the interlocking 'L' exposure group pattern discussed above. "TGa" controls the longer exposure times, and "TGb" controls the shorter exposure times, (or vice versa), with pixel-interconnection of each of the TGa and TGb lines indicated by the dot showing connection to the physical transfer gate in each pixel, (or the appropriate signal node in a multi-bit binary pixel).

Because only one TG line is provided per row, column adjacent pixels wired to the same TG line are read-out concurrently, (see pixels inside the elliptical region in detail view 401 labeled "concurrent read-out"). Consequently, even though the two column-adjacent concurrent read-out pixels are wired to floating diffusions of separate unit cells, an additional column output wire is provided per pixel column to avoid having 2 pixel amplifiers providing an output signal concurrently to the same column output line. Because column-direction routing is relatively unloaded, the additional read-out line per pixel column does not substantially increase the column readout circuit block size.

An exemplary column-line interconnect arrangement is shown in detail view 405, depicting 10 rows and four columns of pixels. The TG signal lines are connected as depicted in detail view 401 and discernable by the two-tone short-exposure pixel shading. A more detailed view of a pair of column-adjacent pixel unit cells and their column line connections is illustrated in detail view 409. As FIG. 15 shows (particularly in detail views 405 and 409), two column output lines are provided per pixel column, with each output line being connected to alternating pixel unit cells—one line coupled to odd-numbered pixel unit cells and the other to even-numbered pixel unit cells, thus ensuring that same exposure and color-plane pixels separated by a pixel unit cell boundary may be read-out concurrently (i.e., without conflict) via respective "odd" and "even" column lines.

FIG. 16 illustrates an interconnection between column read-out lines and read-out logic elements within a line-interleaved embodiment according to FIG. 15. As shown, a respective sample and hold (S/H) bank 431 comprising storage capacitors and switches is provided for each pixel column, with each column output line connected to adjacent pair of S/H banks 431 by a 1:2 multiplexer ("1:2 mx") and associated control logic. Each 1:2 multiplexer (or demultiplexer) controls which of the adjacent S/H banks 431 a given column output line is coupled to during a given read-out operation—an arrangement that changes as rows are sequenced. In one embodiment, for example, each of the 1:2 multiplexers cycles through a sequence of states in response to a control pulse (e.g., a multiplexer clock signal, not shown), an operation described below in reference to FIG. 18.

FIG. 17 presents an exemplary timing diagram for read-out operations within a pair of interleaved rows—rows 5 and 6 in this instance—shown in the embodiments of FIGS. 15 and 16. Note that row 5 is a nominally short-exposure row (i.e., controlled by a TGb transfer-gate line) and row 6 is nominally a long-exposure row (controlled by TGa). In order to read the entire short-exposure row out at the same time in response to assertion of a single TG signal line, the blue pixel in row 6-column 2, (henceforth referred to as B62, see in dashed circle), is read out concurrently with the short-exposure pixels in row 5. The TG signal line for row 5, (TG5) is connected to pixels G52, B62, R53 and G54. During readout of row 5 the B62 output is stored in the column 1 S/H circuit, an opportunity arising from non-readout of the long-exposure pixel at R51, (i.e., R51 is connected to TGa for row 6, while R62 is connected to TGb for row 5 due to the TG line "twist"). Both row select signals (RS) for rows 5 and 6 are activated, (RS5,6). TG5 and TG6 start integration in the standard rolling shutter manner, (only TG5 is shown for convenience). Note that both RG5 and RG6 are activated to clear the floating diffusions. To commence readout of Row 5, RS5,6 is activated and the column multiplexers are set to the condition as shown in FIG. 17 (NC=not connected to a S/H block, #=the column location of the S/H block connected to the output line).

Next, RG5,6 resets the floating diffusions of rows 2-9 in column 1 and 2 and floating diffusions of rows 4-7 in columns 3 and 4, (in a repeating pattern across the array). The reset value of the FDs are then stored in the S/H location according to the mux settings, (SHR pulse). As shown, TG5 is pulsed on and off to transfer charge from the PD to the FD for pixels that have TG wired to TG5. The signal+reset value of the FD's are then stored in the S/H location according to the mux settings, (SHS pulse). At this point, a signal corresponding to short-exposure row r5 is stored in the S/H block. Read-out of long exposure row r6 follows the same sequence, starting with establishing the column-line multiplexer state as shown by the Mux1a-Mux4b signals, then pulsing the RG5,6 line at 451 and pulsing the TG6 line at 453. The read-out sequence can be re-ordered in alternative embodiments.

FIG. 18 depicts a table of exemplary multiplexer states for the multiplexed group of staggered 1×4 cells, (8 rows by 4 columns). Note that this is a repeat pattern that starts in different positions, (same for 1a and 1b but offset by 4 rows, 3a and 3b are offset by 4 rows from each other and 2 rows from 1a and 1b). Columns 2 and 4 have a similar pattern but are offset by 1 row from 1 and 3 respectively and run in a backwards sequence. As a result, the mux control logic can run from a shift register with 3 different states for the mux, (not connected, current column-x, adjacent column x+1 or x−1). Other control sequences may be implemented in alternative embodiments.

Employing 1×4 pixel unit cells that individually span multiple exposure groups as shown in FIG. 15 enables charge domain binning as discussed above and thus increased sensitivity in low light conditions. A 1×2 pixel unit cell architecture or an unshared pixel architecture may also be used in the general architecture shown in FIG. 15, with appropriate changes to the column multiplexer state table shown in FIG. 18.

Figure 19:
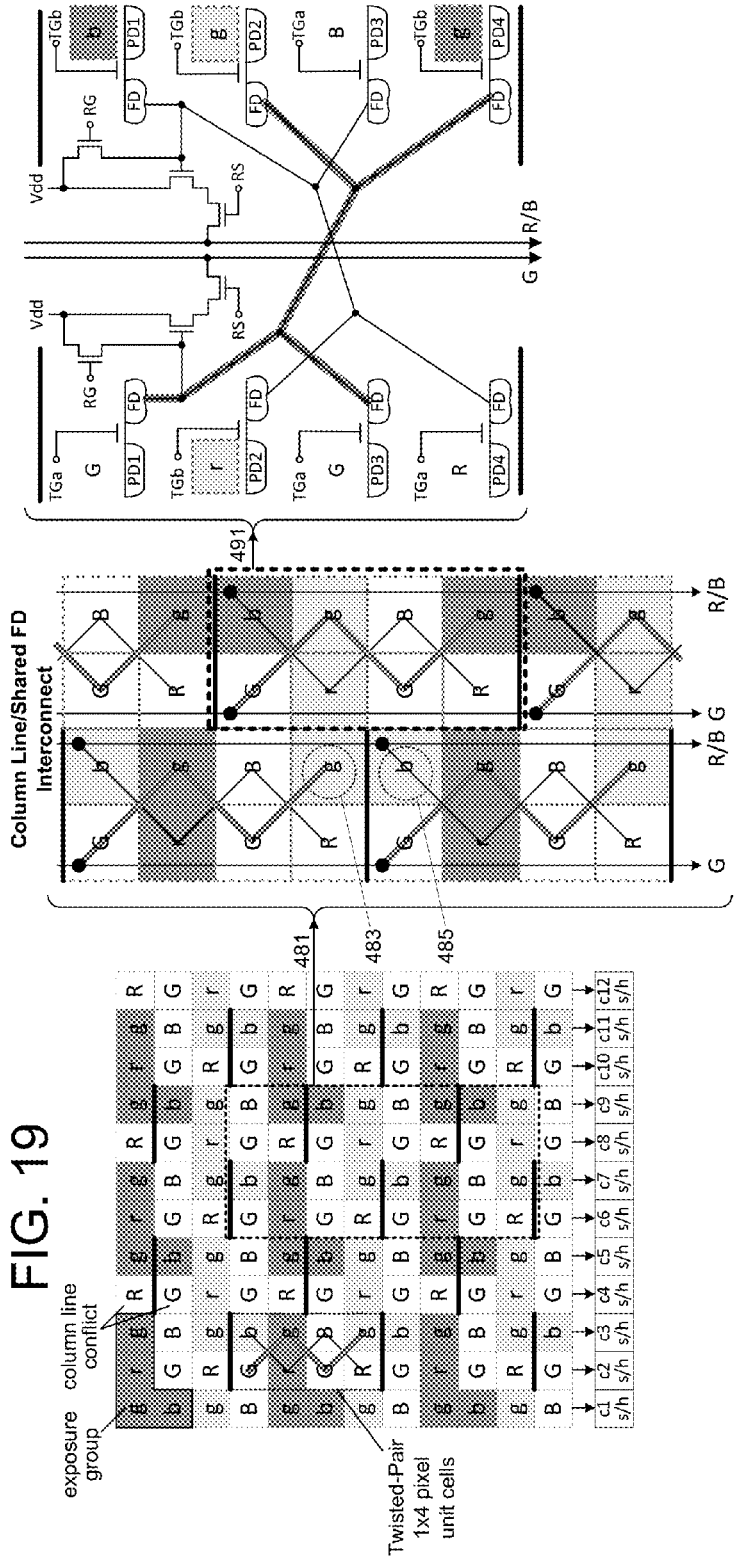
FIG. 19 illustrates an alternative "twisted pair" or "zig-zag" pixel unit cell arrangement that may be used with the various TG line interleaving patterns disclosed herein.

FIG. 19 illustrates an alternative "twisted pair" or "zig-zag" pixel unit cell arrangement that may be used with the line interleaving patterns disclosed herein. The zig-zag 1×4 enables 1 column output line per column instead of the two-per column arrangement shown in FIG. 15. One set of columns (the odd or even numbered columns) are formed by green pixels in the zigzag pattern and the other set of columns (the even or odd numbered columns) is formed by alternating red and blue pixels in the zig-zag pattern, with respective column lines being coupled to green and red/blue zig-zag pixel columns as shown in detail view 481. An exemplary transistor-level implementation of adjacent (intertwined or twisted) pixel unit cells is shown in detail view 491. This zig-zag pixel unit cell arrangement enables charge domain binning of like colored pixels in the same exposure plane (long or short) or even in different exposure planes (e.g., in non-line-interleaved operating modes).

Figure 20:
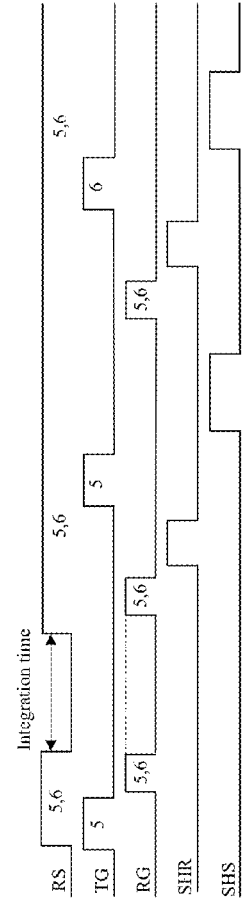
FIG. 20 is a timing diagram illustrating an exemplary read-out operation within the embodiment of FIG. 19.

Referring still to FIG. 19 and also to exemplary read-out timing diagram 20, one can see that green pixels are wired to a first source follower and dedicated column output line, and red/blue pixels are wired to a second source follower and adjacent dedicated column output line. Consequently, in contrast to the embodiment described in reference to FIGS. 15-18, column output multiplexers may be omitted (though column output multiplexers may optionally be deployed if re-ordering into the S/H blocks is desired) as the signals from same-column, same-exposure pixels are driven onto signal lines for adjacent columns. That is, because pixels of similar integration time in the same column during readout are connected to alternate column output lines (i.e., referring to detail view 481, pixel 482 is wired to the R/B output line, while same-column, same-exposure pixel 483 is wired to the G output line), there is no need for a second column output line for each physical column. Accordingly, read-out may be executed without column-line multiplexing as shown by the exemplary control-timing diagram in FIG. 20, with dedicated column output lines delivering pixel output signals directly to respective sample-and-hold locations.

Figure 21:
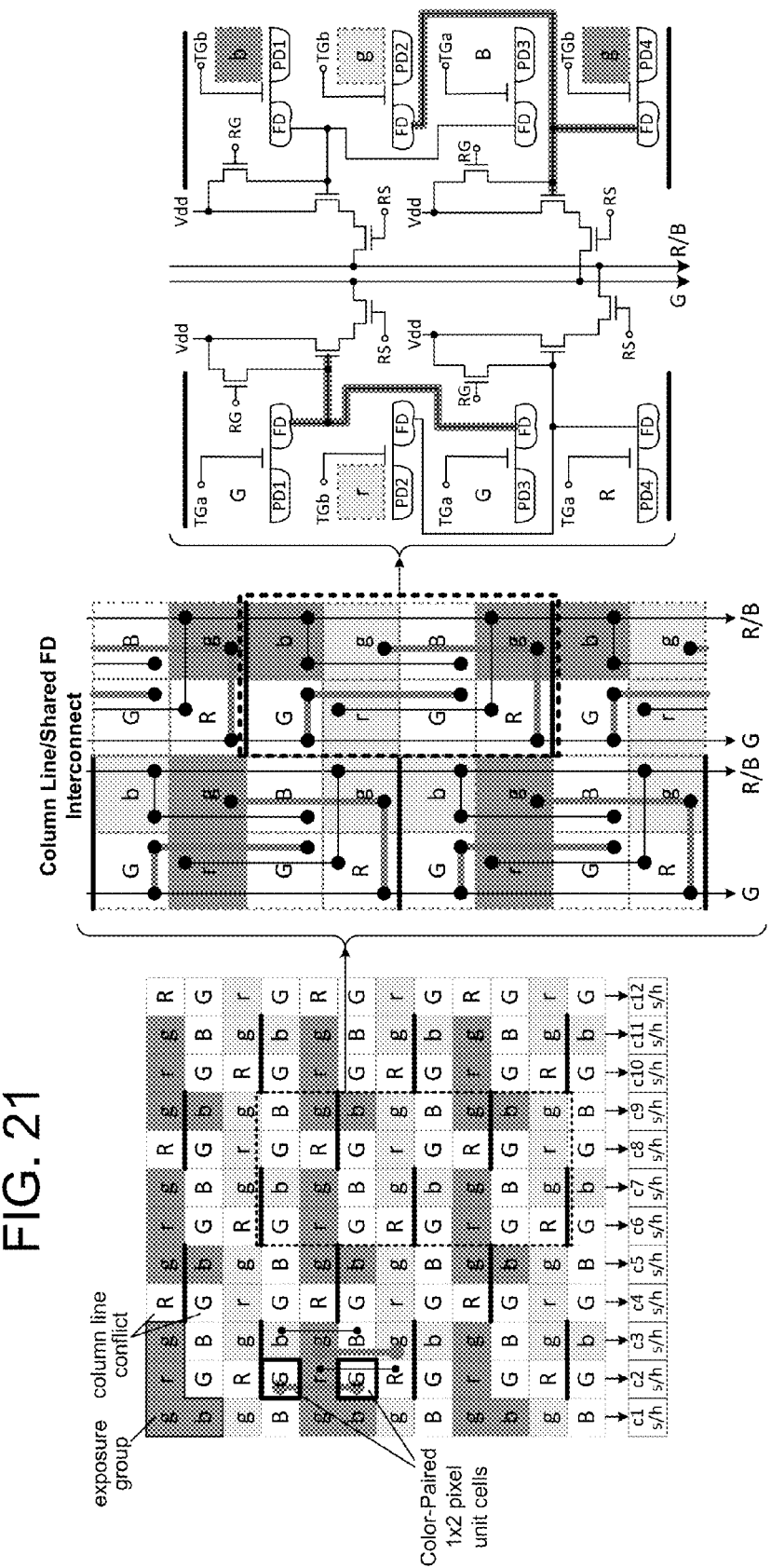
FIG. 21 illustrates an alternative 1×2 "pixel-skipping" pixel unit cell architecture.

FIG. 21 illustrates an alternative 1×2 "pixel-skipping" pixel unit cell architecture. Like the zigzag 1×4, this pattern also enables a single column output line per pixel column and one TG line per row. Although not specifically shown, TG line routing is signified by the two-tone shading of short-exposure pixels and, in the exemplary arrangement shown, follows the twisted-pair, interlocking-L TG line routing shown in FIG. 12A.

Figure 22:
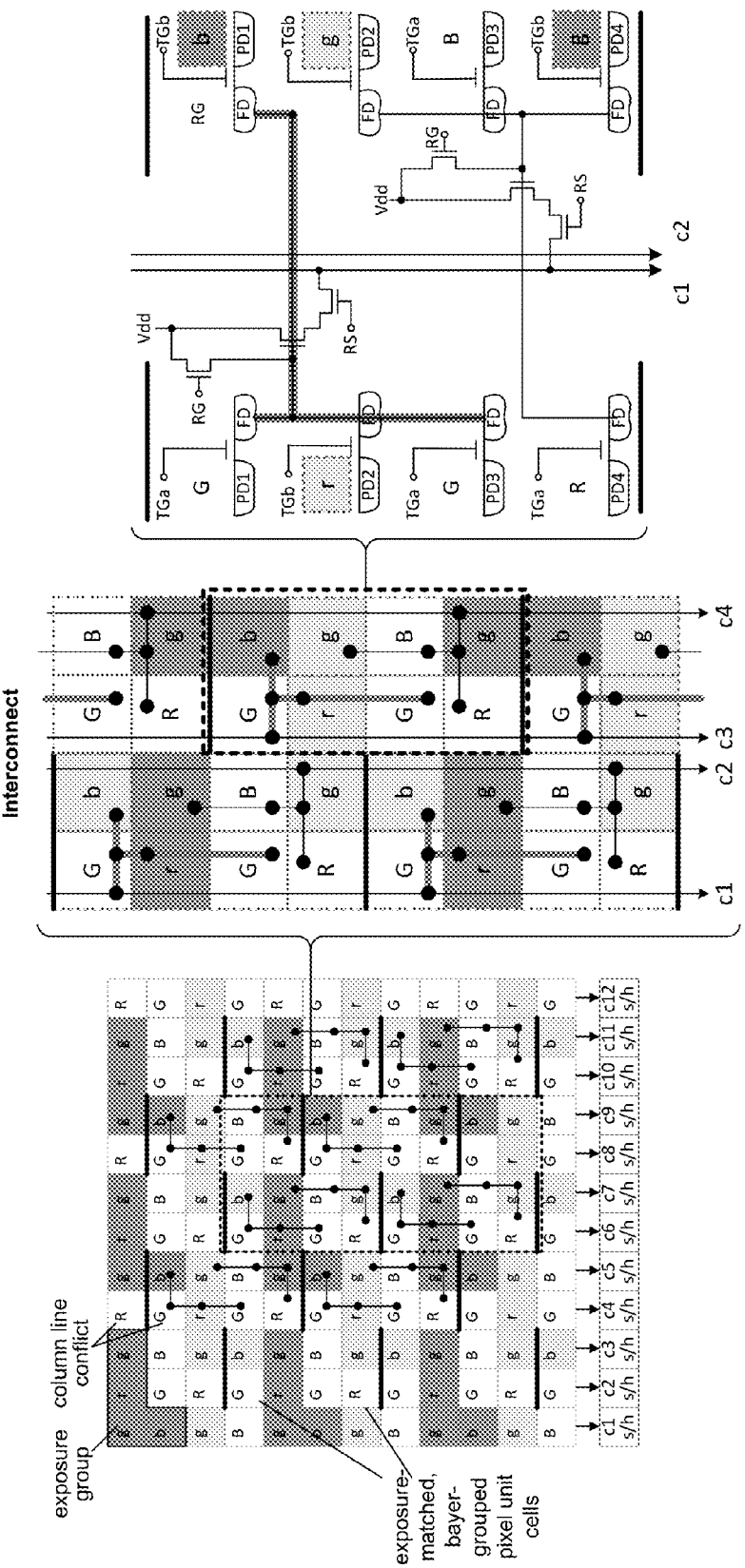
FIG. 22 illustrates another pixel unit cell arrangement that enables a single TG line per row and single output line per column.
Figure 23:
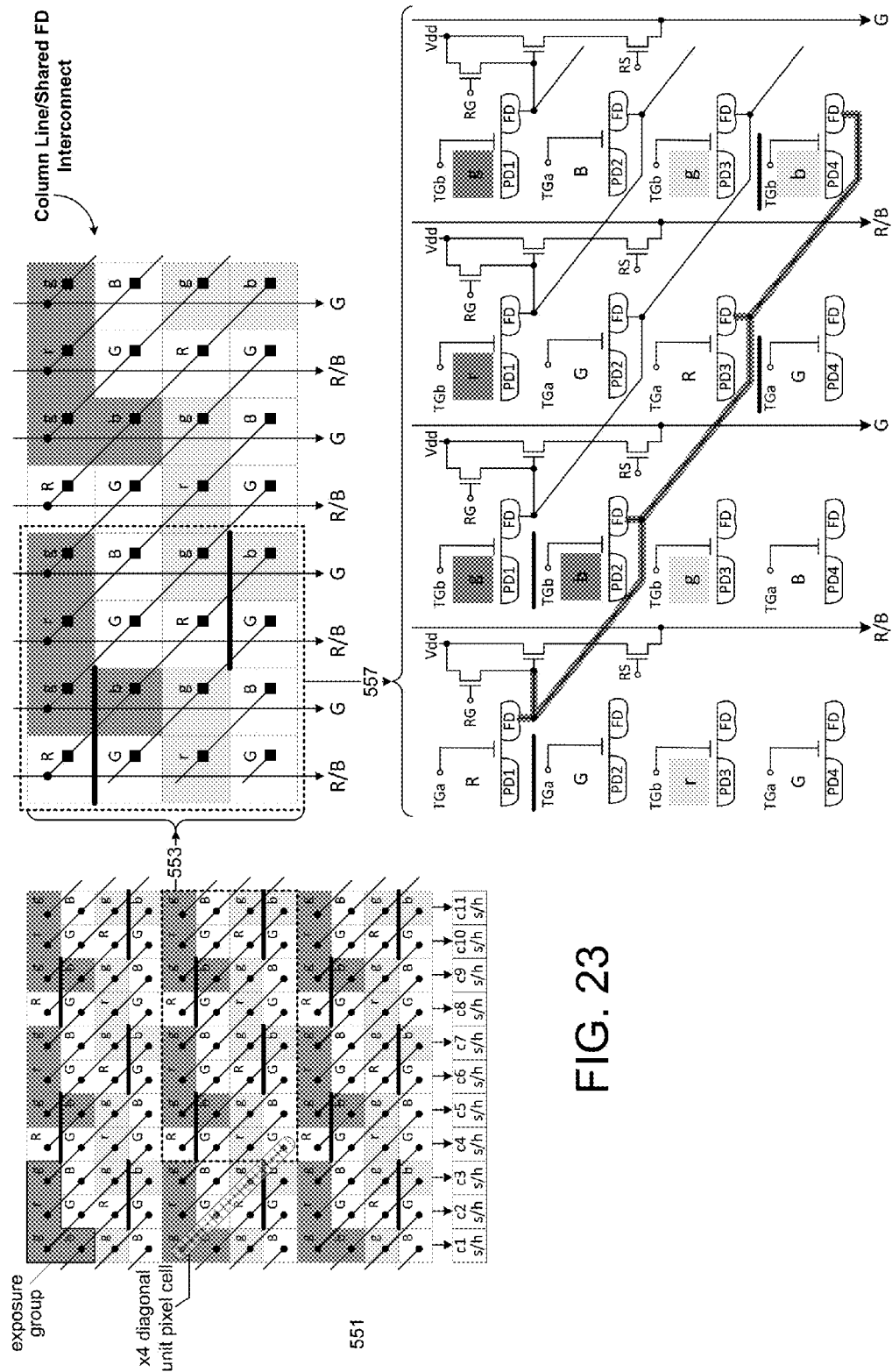
FIG. 23 illustrates an alternative "diagonal" or "backslash" four-pixel unit cell arrangement that also permits a single column output line per column.

FIG. 22 illustrates yet another pixel unit cell arrangement that enables a single TG line per row and single output line per column. In this embodiment the pixel readout hardware described in reference to FIGS. 8 and 9, (grid-aligned TG lines and column output lines, with TG line count and column output line count matching the pixel-array row and column dimensions, respectively of the pixel array), may be used for both conventional and conditional-read pixel arrays. Conditional-read pixels with a column feedback line for control of TG will have a column feedback pattern that follows the shared floating diffusion pattern, (i.e. the column feedback line will skip the single pixel of the alternate integration time in that column and connect to the similar integration time pixel in the adjacent column—following the floating-diffusion connection pattern FIG. 23 illustrates an alternative "diagonal" or "backslash" four-pixel unit cell arrangement that also permits a single column output line per column (instead of two as in the embodiments of FIG. 15). As shown in each of the views at 551, 553 and 557, pixels along the diagonal marked by the backslash (diagonal) interconnect are connected to a common floating diffusion, source follower, row select and column output line. In addition to permitting a single column output line per pixel column, this floating diffusion sharing pattern provides charge-domain binning of like colors. In addition, the backslash pattern permits charge-domain binning for both or either of the long and short exposures for simple conversion to HDR video mode.

Figure 24:
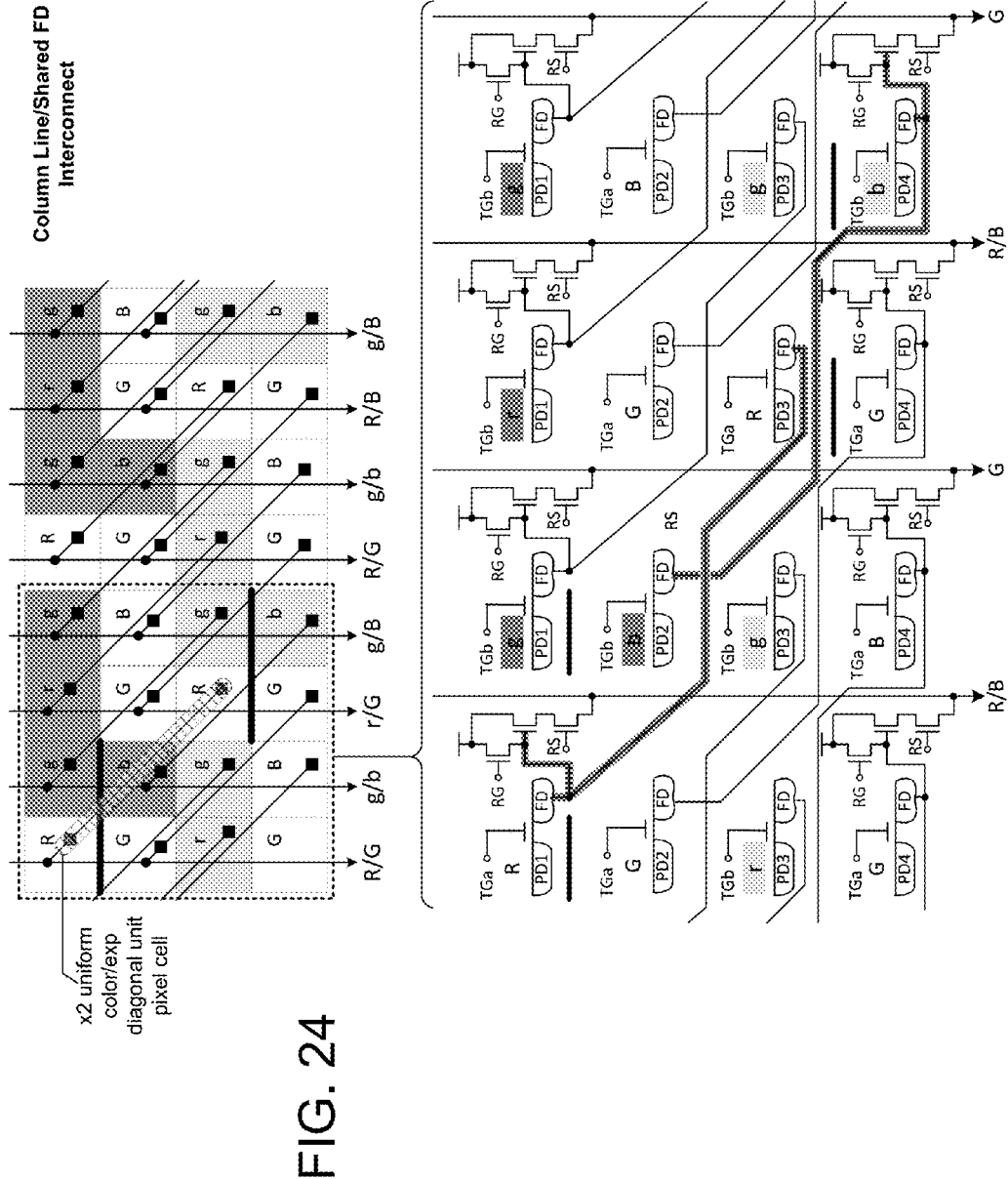
FIG. 24 illustrates another diagonal pixel unit cell arrangement, in this case interconnecting the floating diffusions of two same-color-plane pixels to form dual-pixel unit cells.

FIG. 24 illustrates another diagonal pixel unit cell arrangement, in this case interconnecting the floating diffusions of two same-color-plane pixels to form dual-pixel unit cells. This FD sharing architecture provides the similar benefits to the four-pixel backslash pattern, but may yield higher conversion gain due to the shorter floating diffusion interconnect.

Figure 25:
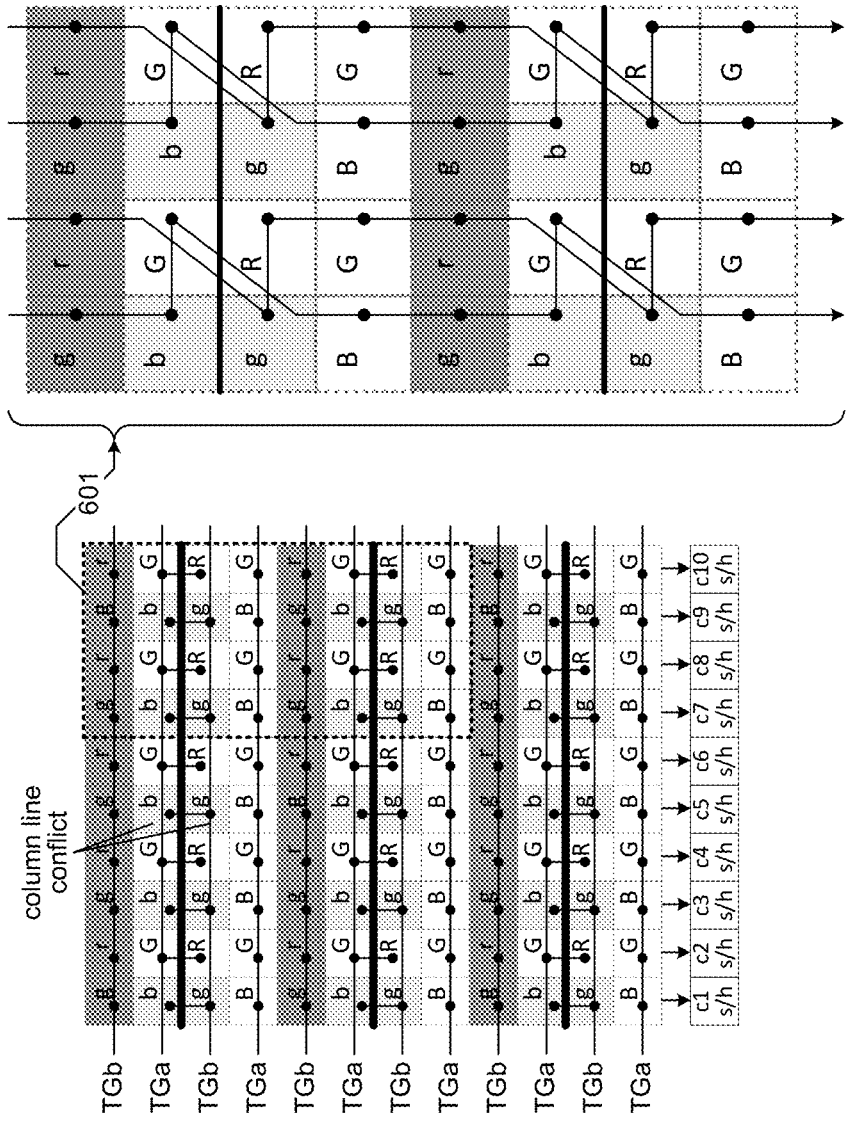
FIG. 25 illustrates an exemplary column line interconnect pattern that may be employed with respect to the interlocking-comb TG line pattern shown in FIG. 14A.

FIG. 25 illustrates an exemplary column line interconnect pattern that may be employed with respect to the interlocking-comb TG line pattern shown in FIG. 14A. As in other embodiments presented herein, shaded regions correspond to short-exposure pixels and non-shaded regions correspond to long-exposure pixels, with dark shading and light-shading identifying groups of short-exposure pixels coupled to distinct TG lines. The bold horizontal lines indicate pixel unit cell boundaries selected to prevent simultaneous read-out from same-column pixels (i.e., in an embodiment having pixel unit cells that span at least two pixel rows). Note that the pixel unit cell boundaries need not be staggered as in embodiments that employ the interlocked-L TG line routing of FIG. 12A. Detail view 601 illustrates a column-line twist that enables simultaneous read-out of column-adjacent pixels coupled to the same TG line (i.e., without requiring more than one column output line per column). Each of the pixel unit cell arrangements described above may be used in combination with the comb-interlocked TG line arrangement of FIG. 25.

TGc Routing

Figure 27:
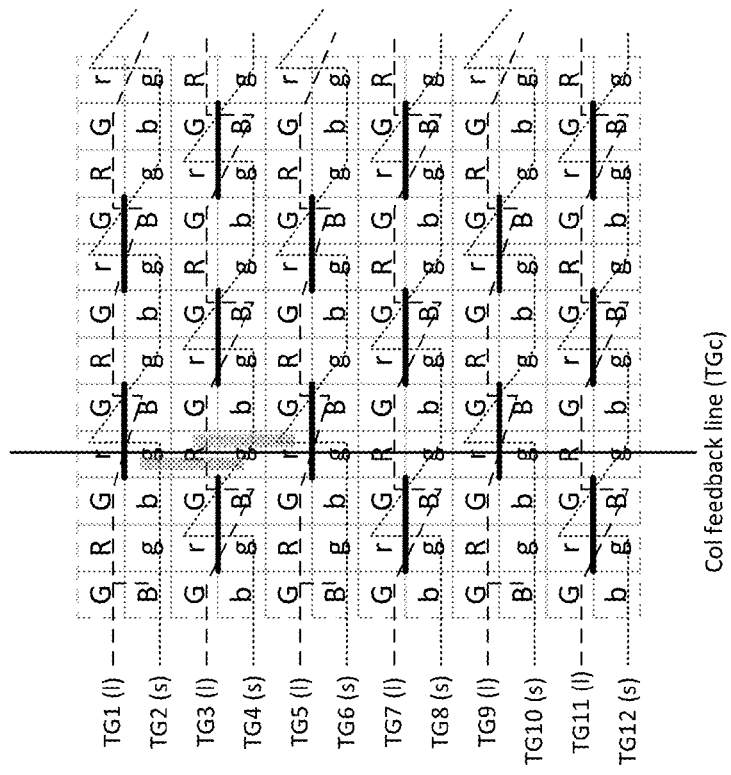
FIG. 27 illustrates another column feedback wiring example in an image sensor embodiment having the twisted-pair, interlocked-L TG line routing shown in FIG. 12A in combination with the pixel-skipping 1×2 pixel unit cell arrangement shown in FIG. 21.
Figure 26:
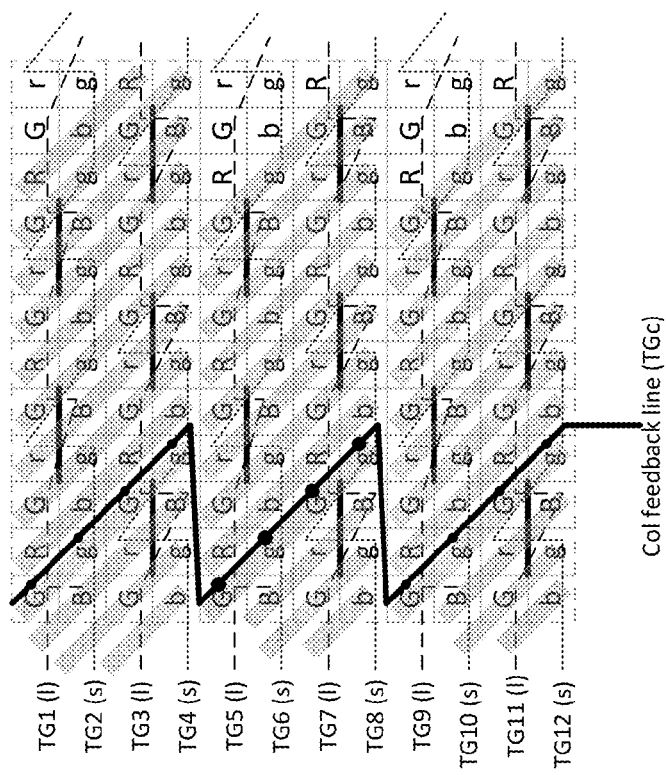
FIG. 26 illustrates an exemplary column feedback (TGc) wiring in an image sensor embodiment having the backslash quad pixel unit cells shown in FIG. 23 in combination with the twisted-pair, interlocked-L TG(row) line wiring shown in FIG. 12A.

Though not specifically shown in FIGS. 10A-25, column-aligned transfer-gate control lines that enable conditional read/reset operation (i.e., the TGc line shown in FIGS. 5-7 and 9) are routed in a pattern that follows the column to which a specific pixel is readout. FIG. 26 illustrates an example of such TGc wiring in an image sensor embodiment having the backslash quad pixel unit cells shown in FIG. 23 in combination with the twisted-pair, interlocked-L TG(row) line wiring shown in FIG. 12A. FIG. 27 illustrates another TGc wiring example in an image sensor embodiment having the twisted-pair, interlocked-L TG line routing shown in FIG. 12A in combination with the pixel-skipping 1×2 pixel unit cell arrangement shown in FIG. 21. Various other TGc line routing schemes may be used in accordance with the pixel unit cell arrangement and row-based TG line routing.

Multi-Frame Line-Interleaved Operation

FIGS. 28, 29A-29D and 30A-30C illustrate line-interleaved sensor operations in which at least one pixel subarray is exposed for a duration that exceeds a frame interval and that temporally overlaps exposure of another pixel subarray. Referring to FIG. 28, for example, each subarray (e.g., even rows or odd rows of pixels in a row-pair interleaving approach, or separate pixel groups according to any of the subarray interleaving arrangements described above) is exposed for a respective interval corresponding to two video frame periods, with the exposure intervals for the two subarrays being time-staggered (pipelined or temporally overlapped) such that one subarray exposure begins at or near the midpoint of the other. By this arrangement, a target video frame rate may be achieved with each video frame being exposed for twice the video frame interval. Further, by executing conditional read-outs at one or more "intermediate" times within the multi-frame exposure (i.e., prior to end-of-exposure "final" read-out), dynamic range and motion detection capability may be enhanced. Thus, in the embodiment of FIG. 28, pixel subarrays A and B are each exposed, starting at video-frame-staggered times, for respective two-frame intervals, with three intermediate read-outs occurring during the exposure interval per subarray. Note that any of the intermediate readouts may be conditional or unconditional, with the example in FIG. 28 showing an unconditional/conditional/conditional intermediate read-out pattern (the shading legend shown at the bottom of FIG. 28 applies also to the exemplary embodiments of FIGS. 29A-29D and FIGS. 30A-30C). Also, while the first unconditional read is shown at the end of a video frame in FIG. 28, this need not be the case in all implementations as the first unconditional read (or all unconditional reads) may be offset from or otherwise out of alignment with video frame boundaries. For a read-out policy in which the subframe duration ratio is 13-1-1-1 (i.e., an initial long subframe followed by three short subframes) and the collective exposure duration spans two video frames, the read-out after the long subframe would be well inside the second video frame. To increase the benefit of the long exposure time, the read-out arrangement may be configured so that both an initial long subframe and the subframe following the initial long subframe are both read-out unconditionally.

FIGS. 29A-29D illustrates additional overlapping spatial subframe exposure techniques in which the spatial subframes are exposed for different durations. FIG. 29A, for example, illustrates overlapping spatial subframes without conditional read, and in which the exposure interval for subarray B is substantially shorter than for subarray A. FIG. 29B illustrates a similar approach in which one or more conditional reads are executed with respect to the "long-exposure" subarray (subarray A in this example), and FIG. 29C illustrates the converse arrangement with one or more conditional reads executed with respect to the short-exposure subarray. FIG. 29D illustrates yet another non-uniform spatial subarray exposure approach in which the subarray read-out rate is different for the long- and short-exposure subarrays (i.e., two short-exposure subarray read-outs per long exposure subarray read-out in the example shown).

FIGS. 30A-30C illustrate further overlapping spatial subframe exposure techniques in which one of the spatial subarrays is conditionally read-out continuously (i.e., no definite end to exposure interval). In such an embodiment, each overthreshold determination during a conditional-read with respect to a given pixel triggers a counter reset, and each underthreshold determination triggers a counter increment with respect to that pixel, thus enabling determination of the net exposure time between read/reset events on a per-pixel basis for purposes of image reconstruction. In the embodiment shown in FIG. 30A, subarray A is subject to continuation conditional read operations, while subarray B is read-out following each multi-frame exposure (which exposure may span any number of video frame intervals (including fractional portions of such intervals) greater than one), with one or more conditional and/or unconditional intermediate read-outs as discussed above. In the embodiment of FIGS. 30B and 30C, multiple unconditional reads are executed with respect to one subarray (while the other is subject to continuous conditional read operation) to improve dynamic range and stop motion performance. This approach may improve results without requiring conditional read operation. The two-frame reconstruction approach described above in reference to FIG. 2 may be used to merge read-outs from the two subarrays.

Interleaved Binning Options for Reduced Power (Short-Exposure Subframe Binning)

Referring again to the embodiment shown in FIG. 1, one long or full-frame exposure is performed on the set of long exposure rows, and three subframe exposures are performed on the set of short exposure rows. In the specific example of line-pair sets for short and long exposures, half of the pixels in the array are exposed for the long exposure, and the other half of the pixels are exposed for three subframe short exposures—a total of four exposures or subframes.

Assuming unconditional readout for all four exposures, each readout is directed to half the pixels in the array. Therefore, the four subframe readouts yield a total of 2× the data (four exposures*half the number of pixels) compared to that of interleaved readout methods with one long and one short exposure, or to a conventional readout with one exposure. In some imaging applications, the larger amount of data and subsequent higher power per image capture is not desirable.

Figure 31:
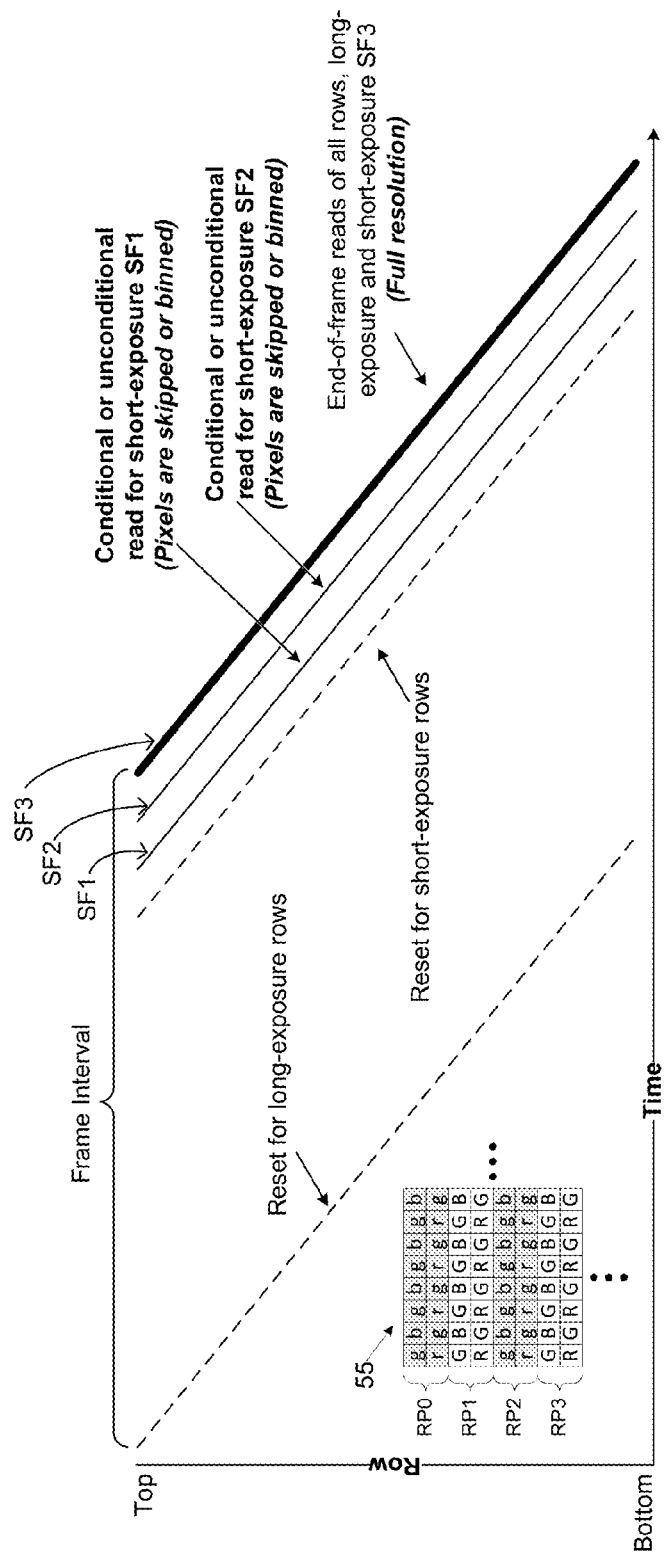
FIG. 31 illustrates an exemplary line-interleaved readout in which one of at least two short exposure subframes is read out with reduced resolution either by skipping selected pixels or binning selected pixels.

In order to retain the higher dynamic range enabled by the 4× temporal oversampling approach of FIG. 1 while only marginally increasing the required amount of data and power, an alternative readout may be employed as shown, for example, in FIG. 31. More specifically, as FIG. 31 illustrates, the first two short exposure subframes, SF1 and SF2 ("SF"="subframe"), are lower than the full resolution by either skipping selected pixels or binning selected pixels. Some examples of binned embodiments (which may be preferred as providing better SNR than pixel-skipping) include, without limitation:

directionally non-uniform subframe binning embodiment: SF1 is binned 2:1 in the horizontal (H) direction; SF2 is binned 2:1 in the vertical (V) direction uniform bi-directional binning embodiment: SF1 and SF2 are 2:1 binned in both the H and V direction In an unconditional read of each subframe in the directionally non-uniform subframe binning embodiment, 1.5 times the data is read out as compared to a conventional line interleaved HDR readout, (SF1 is at ¼ resolution, SF2 is at ¼ resolution, SF3 and the long exposure are at ½ resolution=¼+¼+½+½=1.5). Full resolution spatial detail information is retained in both the H and V direction for the short exposure set of pixels.

In an unconditional read of each subframe in the uniform bi-directional binning embodiment, 1.25 times the data is read out as compared to a conventional line interleaved HDR readout, (SF1 is at ⅛ resolution, SF2 is at ⅛ resolution, SF3 and the long exposure are at ½ resolution=⅛+⅛+½+½=1.25). While total readout data is reduced, full resolution spatial detail information is not retained due to binning in both directions for SF1 and SF2. However, full resolution spatial detail information is retained in both the H and V direction for the last subframe (SF3) of short exposure set of pixels.

Fewer than three subframes can also be implemented for the short-exposure rows to further reduce the data and power requirement while providing higher dynamic range. For example, two short-row sub-exposures (SF1 and SF2) could be employed, with SF1 at less than ½ resolution as discussed above.

In addition to reducing the amount of readout data, the binned readout of at least one of the short exposure subframes as shown in FIG. 31 generally reduces the memory required for construction of the final high dynamic range full resolution image, and may also enable a faster rolling shutter It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific voltages, pixel array sizes, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor, the method comprising:
   integrating photocharge within a first plurality of pixels during a first exposure interval;
   outputting a read-out signal from each pixel of the first plurality of pixels upon conclusion of the first exposure interval, the read-out signal output from each pixel of the first plurality of pixels indicating a respective level of photocharge integrated within that pixel during the first exposure interval;
   integrating photocharge within a second plurality of pixels during a second exposure interval that transpires concurrently with the first exposure interval and has a duration not more than half the duration of the first exposure interval; and
   outputting a read-out signal from each pixel of the second plurality of pixels at least twice with respect to the second exposure interval, the read-out signal output from each pixel of the second plurality of pixels indicating a respective level of photocharge integrated within that pixel during at least a portion of the second exposure interval.

2. The method of claim 1 wherein the outputting the read-out signal from each pixel of the second plurality of pixels at least twice with respect to the second exposure interval comprises outputting a first read-out signal from each pixel of the second plurality of pixels after a first fraction of the second exposure interval transpires, and outputting a second read-out signal from each pixel of the second plurality of pixels after a second fraction of the second exposure interval transpires, the first and second fractions of the second exposure interval transpiring nonconcurrently.

3. The method of claim 2 wherein the first and second fractions of the second exposure interval have different durations and wherein outputting a read-out signal from each pixel of the second plurality of pixels at least twice comprises outputting first and second read-out signals from each pixel of the second plurality of pixels, the method further comprising:
   generating respective first and second digital values corresponding to the first and second read-out signals from each pixel of the second plurality of pixels;
   scaling at least one of the first and second digital values to compensate for the different durations of the first and second fractions of the second exposure interval; and
   after scaling at least one of the first and second digital values, summing the first and second digital values to generate at least a portion of a short-exposure digital pixel value for a corresponding pixel of the second plurality of pixels.

4. The method of claim 2 wherein the outputting the first read-out signal from each pixel of the second plurality of pixels comprises outputting a partial read-out signal from a first pixel of the second plurality of pixels, determining from the partial read-out signal whether a threshold level of charge has integrated within the first pixel and, if the threshold level of charge is determined to have integrated within the first pixel, outputting a full read-out signal from the first pixel representative of total charge integrated within the first pixel during the first fraction of the second exposure interval.

5. The method of claim 1 wherein outputting a read-out signal from each pixel of the second plurality of pixels at least twice comprises outputting first and second read-out signals from each pixel of the second plurality of pixels, the method further comprising:
   generating respective first and second digital values corresponding to the first and second read-out signals from each pixel of the second plurality of pixels; and
   summing the first and second digital values to generate at least a portion of a short-exposure digital pixel value for a corresponding pixel of the second plurality of pixels.

6. The method of claim 5 further comprising generating a long-exposure digital pixel value corresponding to the read-out signal output from each pixel of the first plurality of pixels, and generating a finalized output image based at least in part on a comparison of the long-exposure digital pixel value and the short-exposure digital pixel value.

7. The method of claim 1 wherein the first and second exposure intervals conclude contemporaneously.

8. The method of claim 1 wherein outputting a read-out signal from each pixel of the second plurality of pixels at least twice with respect to the second exposure interval comprises outputting a read-out signal from each pixel of the second plurality of pixels at least three times with respect to the second exposure interval, including outputting a first read-out signal from each pixel of the second plurality of pixels after a first fraction of the second exposure interval transpires, outputting a second read-out signal from each pixel of the second plurality of pixels after a second fraction of the second exposure interval transpires, and outputting a third read-out signal from each pixel of the second plurality of pixels after a third fraction of the second exposure interval transpires, the first, second and third fractions of the second exposure interval transpiring nonconcurrently and collectively spanning the second exposure interval.

9. An integrated-circuit image sensor comprising:
a pixel array including spatially interleaved first and second pixel subarrays; and
read-out circuitry to:
enable each pixel of the first pixel subarray to output a respective read-out signal upon conclusion of a first exposure interval, the read-out signal output from each pixel of the first pixel subarray indicating a respective level of photocharge integrated within that pixel during the first exposure interval, and
enable each pixel of the second pixel subarray to output a respective read-out signal at least twice with respect to a second exposure interval, the read-out signal output from each pixel of the second pixel subarray indicating a respective level of photocharge integrated within that pixel during at least a portion of the second exposure interval.

10. The integrated-circuit image sensor of claim 9 wherein the read-out circuitry to enable each pixel of the second pixel subarray to output the respective read-out signal at least twice with respect to the second exposure interval comprises circuitry to enable each pixel of the second pixel subarray to output a first read-out signal after a first fraction of the second exposure interval transpires and a second read-out signal after a second fraction of the second exposure interval transpires, the first and second fractions of the second exposure interval transpiring nonconcurrently.

11. The integrated-circuit image sensor of claim 10 wherein the first and second fractions of the second exposure interval have different durations, wherein the read-out circuitry further comprises analog-to-digital conversion circuitry to generate respective first and second digital values corresponding to the first and second read-out signals from each pixel of the second pixel subarray, and wherein the integrated-circuit image sensor further comprises reconstruction circuitry to:
scale at least one of the first and second digital values to compensate for the different durations of the first and second fractions of the second exposure interval; and
after scaling at least one of the first and second digital values, sum the first and second digital values to generate at least a portion of a short-exposure digital pixel value for a corresponding pixel of the second pixel subarray.

12. The integrated-circuit image sensor of claim 10 wherein the circuitry to enable each pixel of the second pixel subarray to output the first read-out signal after the first fraction of the second exposure interval transpires and the second read-out signal after the second fraction of the second exposure interval transpires comprises conditional-read circuitry to:
enable a first pixel of the second pixel subarray to output a partial read-out signal;
determine from the partial read-out signal whether a threshold level of charge has integrated within the first pixel; and
if the threshold level of charge is determined to have integrated within the first pixel, enable the first pixel to output a full read-out signal representative of total charge integrated within the first pixel during the first fraction of the second exposure interval.

13. The integrated-circuit image sensor of claim 9 wherein the read-out circuitry to enable each pixel of the second pixel subarray to output a respective read-out signal at least twice with respect to the second exposure interval comprises analog-to-digital conversion circuitry to generate respective first and second digital values corresponding to first and second read-out signals output from each pixel of the second pixel subarray, and wherein the integrated-circuit image sensor further comprises circuitry that sums the first and second digital values to generate at least a portion of a short-exposure digital pixel value for the corresponding pixel of the second pixel subarray.

14. The integrated-circuit image sensor of claim 13 wherein the read-out circuitry comprises analog-to-digital conversion circuitry to generate a long-exposure digital pixel value corresponding to the read-out signal output from each pixel of the first pixel subarray, and wherein the integrated-circuit image sensor further comprises reconstruction circuitry to generate a finalized output image based at least in part on a comparison of the long-exposure digital pixel value and the short-exposure digital pixel value.

15. The integrated-circuit image sensor of claim 9 wherein the first and second intervals conclude contemporaneously.

16. The integrated-circuit image sensor of claim 9 wherein the read-out circuitry to enable each pixel of the second pixel subarray to output a respective read-out signal at least twice with respect to the second exposure interval comprises circuitry to enable each pixel of the second pixel subarray to output a read-out signal at least three times with respect to the second exposure interval, including a first read-out signal from each pixel of the second pixel subarray after a first fraction of the second exposure interval transpires, a second read-out signal from each pixel of the second pixel subarray after a second fraction of the second exposure interval transpires, and a third read-out signal from each pixel of the second pixel subarray after a third fraction of the second exposure interval transpires, the first, second and third fractions of the second exposure interval transpiring nonconcurrently and collectively spanning the second exposure interval.

17. A method of operation within an integrated-circuit image sensor, the method comprising:
integrating photocharge within a first plurality of pixels during a first exposure interval;
outputting a read-out signal from each pixel of the first plurality of pixels upon conclusion of the first exposure interval, the read-out signal output from each pixel of the first plurality of pixels indicating a respective level of photocharge integrated within that pixel during the first exposure interval;
integrating photocharge within a second plurality of pixels during a second exposure interval that transpires concurrently with the first exposure interval and has a duration not more than half the duration of the first exposure interval; and
outputting read-out signals from the second plurality of pixels in each of at least two subintervals of the second exposure interval, including outputting read-out signals from the second plurality of pixels that indicate a combined level of photocharge integrated within respective groups of at least two pixels of the second plurality of pixels during at least a portion of the second exposure interval.

18. The method of claim 17 wherein the outputting read-out signals from the second plurality of pixels in each of at least two subintervals of the second exposure interval comprises outputting a first read-out signal from a first group of at least two pixels of the second plurality of pixels after a first fraction of the second exposure interval transpires, and outputting a second read-out signal from the first group of at least two pixels of the second plurality of pixels after a second fraction of the second exposure interval transpires, the first and second fractions of the second exposure interval transpiring nonconcurrently.

19. The method of claim 17 wherein the outputting read-out signals from the second plurality of pixels that indicate a combined level of photocharge integrated within respective groups of at least two pixels of the second plurality of pixels comprises outputting read-out signals that indicate a combined level of photocharge integrated within respective groups of at least two pixels in which the constituent pixels of each respective group are disposed in either a single row of pixels within the integrated-circuit image sensor or in a single column of pixels within the integrated-circuit image sensor.

20. The method of claim 17 wherein outputting read-out signals from the second plurality of pixels that indicate a combined level of photocharge integrated within respective groups of at least two pixels of the second plurality of pixels comprises outputting read-out signals that indicate a combined level of photocharge integrated within respective groups of at least four pixels, each group of at least four pixels including pixels disposed in different rows of pixels within the integrated-circuit image sensor and pixels disposed in different columns of pixels within the integrated-circuit image sensor.

* * * * *